US010162583B2

(12) United States Patent
Ge et al.

(10) Patent No.: US 10,162,583 B2
(45) Date of Patent: Dec. 25, 2018

(54) SYSTEM AND METHOD FOR PRINTING

(71) Applicants: Canon Information and Imaging Solutions, Inc., Melville, NY (US); Canon U.S.A., Inc., Melville, NY (US)

(72) Inventors: Jiuyuan Ge, Centereach, NY (US); Anthony Louis DeMartini, St. James, NY (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 36 days.

(21) Appl. No.: 14/791,118

(22) Filed: Jul. 2, 2015

(65) Prior Publication Data
US 2017/0003921 A1 Jan. 5, 2017

(51) Int. Cl.
*G06F 3/12* (2006.01)
(52) U.S. Cl.
CPC .......... *G06F 3/1236* (2013.01); *G06F 3/1274* (2013.01); *G06F 3/1286* (2013.01); *G06F 3/1292* (2013.01)
(58) Field of Classification Search
CPC .... G06F 3/1236; G06F 3/1292; G06F 3/1286; G06F 3/1274
USPC ........................................................ 358/1.14
See application file for complete search history.

(56) References Cited

U.S. PATENT DOCUMENTS

| 6,246,486 | B1 * | 6/2001 | Takahashi | G06F 3/1206 |
| | | | | 358/1.13 |
| 7,426,049 | B2 * | 9/2008 | Peter | G06K 15/1817 |
| | | | | 358/1.13 |
| 7,528,978 | B2 | 5/2009 | Randt | |
| 7,634,541 | B2 | 12/2009 | Chen et al. | |
| 7,667,865 | B2 | 2/2010 | Ciriza et al. | |
| 8,189,225 | B1 | 5/2012 | Lo et al. | |
| 8,319,992 | B2 | 11/2012 | Wei | |

(Continued)

FOREIGN PATENT DOCUMENTS

CN 1993688 A 7/2007

OTHER PUBLICATIONS

"Print Driver Based Job Forwarding," IP.com I, LLC., Jul. 6, 2011.

(Continued)

*Primary Examiner* — Neil R McLean
*Assistant Examiner* — Darryl V Dottin
(74) *Attorney, Agent, or Firm* — Canon U.S.A., Inc. IP Division

(57) ABSTRACT

Systems, methods, and computer-readable media are provided. Some embodiments include maintaining, at a mobile computing device, a record associated with a print job submitted to a first printing device, the record including information for locating the first printing device and information that identifies the print job. Some embodiments include sending, from the mobile computing device to a second printing device, a message that includes the information for locating the first printing device and the information that identifies the print job, the message comprising a request to execute the print job at the second printing device. Some embodiments include receiving the message from the mobile computing device, sending a request for the print job, receiving the print job, and executing a printing operation based on the print job.

20 Claims, 11 Drawing Sheets

(56) References Cited

U.S. PATENT DOCUMENTS

| | | | |
|---|---|---|---|
| 8,477,350 B2 | 7/2013 | Jazayeri et al. | |
| 8,493,579 B2 | 7/2013 | Tecu et al. | |
| 8,593,677 B2 | 11/2013 | Nishimi et al. | |
| 9,535,643 B2* | 1/2017 | Waller | H04N 1/00244 |
| 2003/0011804 A1 | 1/2003 | Peter et al. | |
| 2003/0011813 A1* | 1/2003 | Peter | G06F 3/1204 |
| | | | 358/1.15 |
| 2003/0101342 A1 | 5/2003 | Hansen | |
| 2006/0044596 A1* | 3/2006 | Ota | H04N 1/00204 |
| | | | 358/1.15 |
| 2006/0055952 A1* | 3/2006 | Ferlitsch | G06K 15/02 |
| | | | 358/1.13 |
| 2010/0069008 A1* | 3/2010 | Oshima | H04W 4/02 |
| | | | 455/41.3 |
| 2010/0195154 A1* | 8/2010 | Izaki | G06F 3/1205 |
| | | | 358/1.15 |
| 2012/0127519 A1 | 5/2012 | Kikuchi | |
| 2012/0307298 A1* | 12/2012 | Ishige | H04N 1/00222 |
| | | | 358/1.15 |
| 2013/0003115 A1 | 1/2013 | Uchikawa | |
| 2013/0027741 A1 | 1/2013 | Liu | |
| 2013/0077124 A1 | 3/2013 | Vojak | |
| 2013/0083337 A1 | 4/2013 | Tecu et al. | |
| 2013/0107314 A1 | 5/2013 | Steely et al. | |
| 2013/0179961 A1* | 7/2013 | Abe | G06F 21/44 |
| | | | 726/9 |
| 2014/0055812 A1* | 2/2014 | DeRoller | H04N 1/00854 |
| | | | 358/1.15 |

OTHER PUBLICATIONS

"Network Printer," IP.com I, LLC., Apr. 8, 2004.
"Mobile Device Printing," IP.com I, LLC., Oct. 13, 2011.
"Epson Connect Solutions," Epson America, Inc., 2013.
"HotSpot—Mobile Printing Offerings," Ricoh Americas Corp., 2016.
"Optimization That Can Reduce Network Traffic by up to 50% When Printing to Many Printers and Multi-Functional Devices Through a Network Print Server," IP.com I, LLC., Nov. 1, 2005.
"Enhanced Locked Print NX—Overview," Ricoh Americas Corp., 2014.
"Enhanced Locked Print NX—Features & Benefits," Ricoh Americas Corp., 2014.
"Enhanced Locked Print NX—Print Security Solution," Ricoh Americas Corp., 2014.
"FlexRelease CX," Ricoh Americas Corp., 2013.
"Direct Print & Scan for Mobile—Version 2.0—Installation and User's Guide," Canon U.S.A., Inc., 2013.
"Printing in iOS," Apple, Inc., Sep. 19, 2012.
"Dynamic Print Routing," Capella Technologies, Sep. 25, 2012.
"SafeCom Solutions Overview," Nuance Communications, Inc., Feb. 2012.
"I-Queue: The intelligent print queue," Nuance Communications, Inc., 2013.
"Mobile Print Release—Releasing print jobs on your mobile," Papercut Software International Pty Ltd., 2014.

* cited by examiner

SYSTEM AND METHOD FOR PRINTING

BACKGROUND OF THE INVENTION

Field of the Invention

The present invention relates generally to printing, and more particularly to systems and methods for printing using printing devices connected to a network.

Description of the Related Art

Printing devices are commonly used in a network environment. For example, a user of a computing device connected to a network may desire to print from the computing device to a printing device connected to the network. In some instances, one or more servers connected to the network may be used to facilitate a print request. For example, in some conventional systems, a print job may be sent to a server instead of to a particular printing device connected to the network. A user may then access the print job on the server from a printing device connected to the network. Based on one or more user inputs at the printing device, the print job may be sent from the server to the printing device and printed at the printing device.

BRIEF SUMMARY OF THE INVENTION

Systems, methods, and computer-readable media for printing are disclosed.

Some embodiments of the invention include maintaining, at a mobile computing device, a record associated with a print job submitted to a first printing device, the record including information for locating the first printing device and information that identifies the print job. The mobile computing device sends, to a second printing device, a message that includes the information for locating the first printing device and the information that identifies the print job, the message comprising a request to execute the print job at the second printing device.

Some embodiments of the invention include receiving, at a first printing device from a mobile computing device, a message that includes information for locating a second printing device and information that identifies a print job, the message comprising a request to execute the print job at the first printing device. The first printing device sends, to the second printing device, a request for the print job. The first printing device receives, from the second printing device, the print job. The first printing device executes a printing operation based on the print job.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Embodiments of the present invention are described with reference to the drawings.

Figure 1:
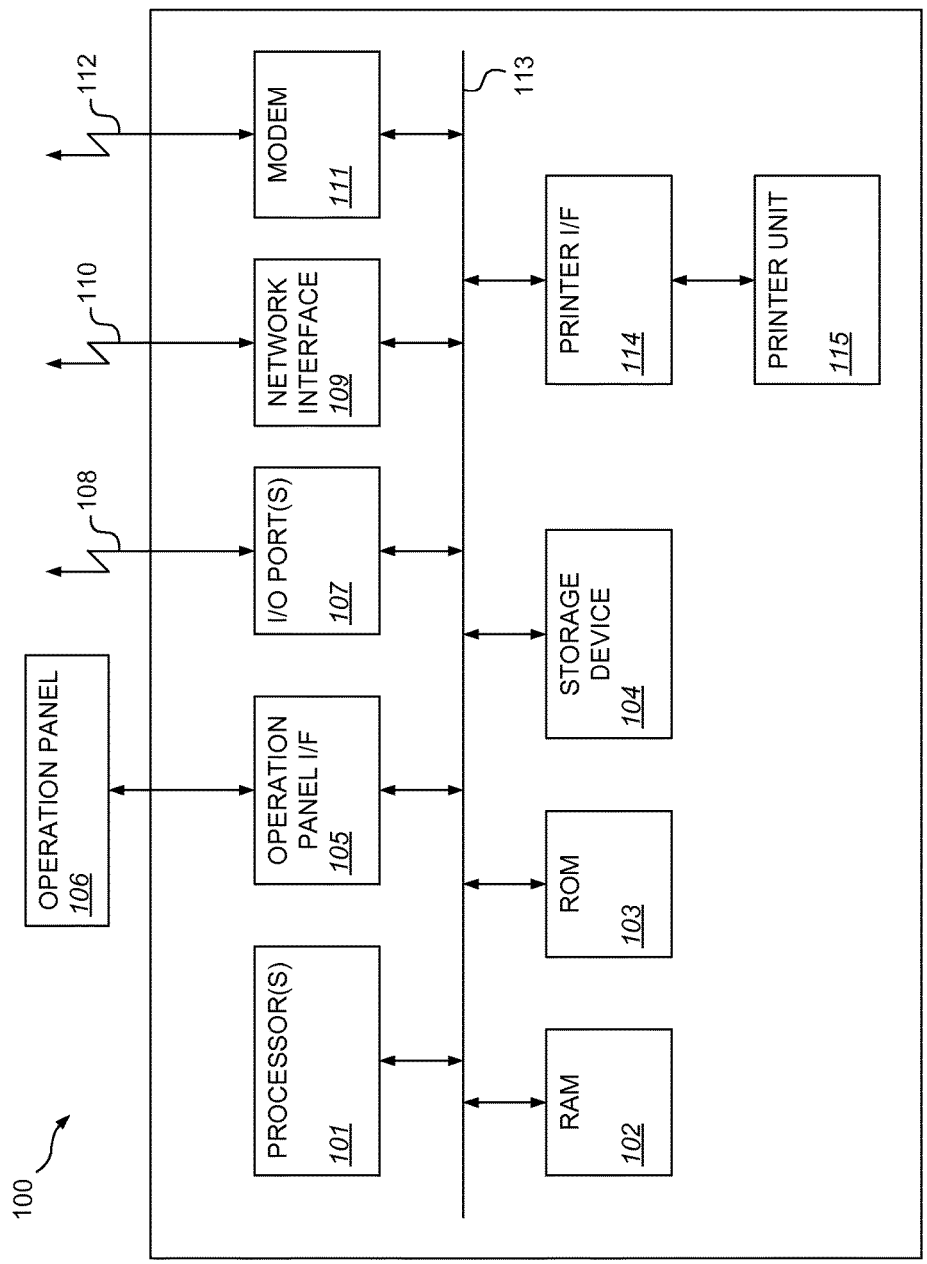
FIG. 1 illustrates an example printing device.

FIG. 1 illustrates an example printing device 100. The printing device 100 may be any suitable device for printing. In some embodiments, the printing device 100 is a single-function printer. In some embodiments, the printing device 100 is a multifunction peripheral having one or more functions in addition to a printing function. For example, the printing device 100 may include functionality for scanning, copying, sending/receiving facsimile communications, sending/receiving files, or other suitable function. It will be understood that various implementations of a printing device are within the scope of the present invention. For example, various components, modules, functions, and/or configurations of the printing device 100 of FIG. 1 could be combined, deleted, or modified, or one or more features could be added, to form further implementations.

The printing device 100 includes one or more processor(s) 101. The processor(s) 101 include a central processing unit (CPU) that performs overall control functions for the printing device 100. The CPU uses a random access memory (RAM) 102 as a work area while executing instructions. The CPU executes instructions of various programs stored in one or more memory devices. For example, the CPU executes programs stored in a read only memory (ROM) 103 and in a storage device 104.

In some embodiments, the processor(s) 101 include one or more processors in addition to the CPU. By way of example, the processor(s) 101 may include one or more general-purpose microprocessor(s), application-specific microprocessor(s), and/or special purpose microprocessor(s). Additionally, in some embodiments the processor(s) 101 may include one or more internal caches for data or instructions.

The processor(s) 101 provide the processing capability required to execute an operating system, application programs, and various other functions provided on the printing device 100. The processor(s) 101 perform or cause components of the printing device 100 to perform various operations and processes described herein, in accordance with instructions stored in one or more memory devices.

The RAM 102 is used as a work area when the processor(s) 101 execute various instructions, such as those making up computer programs stored in the ROM 103 and/or the storage device 104. The RAM 102 may be used as a temporary storage area for various data, such as print data, image data, or other suitable data. The RAM 102 may be used as a cache memory. In some embodiments, the RAM may be dynamic RAM (DRAM) or static RAM (SRAM).

The ROM 103 stores data and programs having computer-executable instructions for execution by the processor(s) 101. In some embodiments, the ROM 103 is a boot ROM, storing instructions for the booting process. In some embodiments, the ROM 103 may be flash memory.

The storage device 104 stores application data, program modules and other information. One or more program modules stored in the storage device 104 are configured to cause various operations and processes described herein to be executed. For example, in some embodiments, the storage device 104 stores instructions for: receiving, at the printing device 100 from a mobile computing device, a message that includes information for locating a second printing device and information that identifies a print job, the message comprising a request to execute the print job at the printing device 100; sending, from the printing device 100 to the second printing device, a request for the print job; receiving, at the printing device 100 from the second printing device, the print job; and executing, at the printing device 100, a printing operation based on the print job, or a combination of these, in accordance with embodiments described herein. In some embodiments, an application residing on the storage device 104 and executing on the printing device 100 performs one or more steps of one or more methods described or illustrated herein or provides functionality described or illustrated herein. For example, one or more programs of an application on the storage device 104 may include instructions that, when executed by the processor(s) 101, cause the processor(s) 101 to perform one or more operations described or illustrated herein.

The storage device 104 also stores other programs and data to be processed. For example, the storage device 104 stores an operating system including programs and data for managing hardware and software components of the printing device 100. Applications on the printing device 100 may utilize the operating system to perform various operations. The storage device 104 may further store other programs and/or drivers that enable various functions of the printing device 100, graphical user interface (GUI) functions, and/or processor functions. The storage device 104 may also store data files including, for example, print data, image data, user data, configuration information, GUI components, such as graphical elements or templates, or other data required by the printing device 100.

In some embodiments, the printing device 100 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the printing device 100. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 105 provides output signals to and receives input signals from an operation panel 106. In some embodiments, the operation panel 106 includes a display. The display may include a liquid crystal display (LCD) and a backlight which illuminates the LCD. Regarding the output signals, the operation panel interface 105 provides GUI data to the operation panel 106 for display on the LCD. Regarding the input signals, the operation panel interface 105 receives input signals based on user inputs at the operation panel 106 and relays the input signals to the processor(s) 101. In some embodiments, the operation panel 106 includes a touch sensitive element operable to receive user inputs or commands based on the touching of graphical objects displayed on the LCD. In some embodiments, the operation panel 106 includes a hard key panel.

Regarding outputting signals to the display of the operation panel 106, the processor(s) 101 rasterize an image to be displayed on the display, and transfer the rasterized image to the display via the operation panel interface 105. The display then displays the image, such as a GUI. The processor(s) 101 are further operable to cause other types of images, such as images of files or scanned physical documents, to be displayed on the display. The processor(s) 101 may also turn on/off the backlight via the operation panel interface 105.

In some embodiments, the display of the operation panel 106 is operable to display a machine-readable code. For example, the processor(s) 101 may execute instructions to present a machine-readable code on the display. The processor(s) 101, when executing the instructions, may cause the display to display a two-dimensional barcode, such as a quick response (QR) code. In some embodiments, the machine-readable code includes information associated with the printing device 100. For example, information that identifies the printing device 100 may be encoded in the machine-readable code. The encoded information may include, for example, an Internet Protocol (IP) address, hostname, or other suitable information that identifies the printing device 100. In some embodiments, the information included in the machine-readable code is usable by a mobile computing device to establish a communication session between the mobile computing device and the printing device 100.

Regarding receiving input signals from the operation panel 106, in some embodiments, the display of the operation panel 106 further includes a touch sensitive element operable to receive user inputs or commands based on the touching of interface elements presented in a GUI on the display. The interface element may be a graphical object displayed on the display. A user may touch the touch sensitive display with a finger, stylus, or other tool to provide a user input. When the user touches a specific region on the touch sensitive display, the processor(s) 101 are notified via the operation panel interface 105 of the coordinates of the region. The processor(s) 101 determine the content of a user input based on the notified coordinates and the display contents on the display, and execute processing based on them.

User inputs may also be provided via a hard key panel of the operation panel 106. When the user presses a hard key of the hard key panel, the processor(s) 101 are notified via the operation panel interface 105 of information indicative of the user input. The processor(s) 101 execute processing based on the notification. Any suitable implementation of hard key panel may be utilized. By way of example, input structures on the hard key panel may exist in various forms including buttons, keys, switches, control pads, and so forth, depending on specific implementation requirements. The input structures may be arranged in any suitable manner.

In the manner described above, a user can provide user inputs via a hard key panel and/or a touch sensitive display to control the printing device 100 via the operation panel 106. Moreover, the printing device 100 can output information to the user and issue requests (e.g., a request for log-in credentials or for a user to make a selection) by outputting images on the display of the operation panel 106.

The printing device 100 includes one or more input/output (I/O) port(s) 107. The I/O port(s) 107 may include any suitable interface type such as a universal serial bus (USB) port, FireWire port (IEEE-1394), serial port, parallel port, or AC/DC power connection port. The I/O port(s) 107 enable one or more external device(s) 108 to communicate with the printing device 100 when the external device(s) 108 is/are connected to the I/O port(s) 107. Examples of external devices 108 include a near field communication (NFC) interface (e.g., an NFC reader), a smart card reader, radio-frequency identification (RFID) reader, device for detecting biometric information, a keyboard, keypad, sensor(s), a combination of two or more of these, or other suitable device.

A network interface 109 includes hardware, software, or both providing one or more interfaces for communication (such as, for example, packet-based communication) between the printing device 100 and one or more other computing systems or one or more networks 110. As an example and not by way of limitation, the network interface 109 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 109 for it. As an example and not by way of limitation, the printing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the printing device 100 may communicate with a wireless PAN (WPAN) (such as, for example, a BLUETOOTH WPAN), a WI-FI network, a WI-MAX network, or other suitable wireless network or a combination of two or more of these. The printing device 100 may include any suitable network interface 109 for any of these networks 110, where appropriate.

A modem 111 modulates/demodulates image data and control signals. The modem 111 is connected to the Public Switched Telephone Network (PSTN) 112 and performs input/output of information between the printing device 100 and the PSTN 112. By way of example, the modem 111 may send/receive facsimile communications.

A system bus 113 interconnects various components of the printing device 100 thereby enabling the transmission of data and execution of various processes. The system bus 113 may include one or more types of bus structures including a memory bus or memory controller, a peripheral bus, and a local bus using any of a variety of bus architectures.

The printer interface 114 is connected to the printer unit 115. The printer interface 114 performs conversion of image data. The printer unit 115 is an image output device for printing on a sheet an image corresponding to image data. In response to a print command received at the printing device 100, the printer unit 115 receives image data via the printer interface 114 and outputs to a sheet an image corresponding to the image data.

Figure 2:
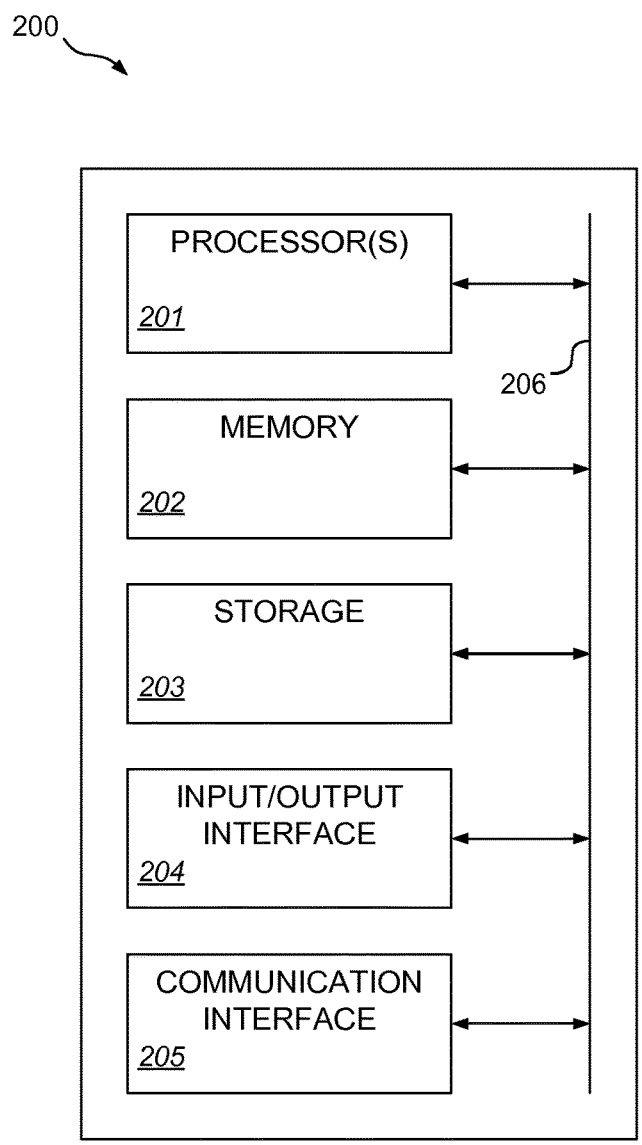
FIG. 2 illustrates an example mobile computing device.

FIG. 2 illustrates an example mobile computing device 200. The mobile computing device 200 includes one or more processor(s) 201, memory 202, storage 203, an input/output (I/O) interface 204, a communication interface 205, and a bus 206. The mobile computing device 200 may take any suitable physical form. For example, and not by way of limitation, the mobile computing device 200 may be a personal digital assistant (PDA), a mobile telephone, a laptop or notebook computer system, or a tablet computer system.

The processor(s) 201 include hardware for executing instructions, such as those making up a computer program. The processor(s) 201 may retrieve the instructions from the memory 202, the storage 203, an internal register, or an internal cache. The processor(s) 201 then decode and execute the instructions. Then, the processor(s) 201 write one or more results to the memory 202, the storage 203, the internal register, or the internal cache. The processor(s) 201 may provide the processing capability to execute the operating system, programs, user and application interfaces, and any other functions of the mobile computing device 200.

The processor(s) 201 may include a central processing unit (CPU), one or more general-purpose microprocessor(s), application-specific microprocessor(s), and/or special purpose microprocessor(s), or some combination of such processing components. The processor(s) 201 may include one or more graphics processors, video processors, audio processors and/or related chip sets.

In some embodiments, the memory 202 includes main memory for storing instructions for the processor(s) 201 to execute or data for the processor(s) 201 to operate on. By way of example, the mobile computing device 200 may load instructions from the storage 203 or another source to the memory 202. During or after execution of the instructions, the processor(s) 201 may write one or more results (which may be intermediate or final results) to the memory 202. One or more memory buses (which may each include an address bus and a data bus) may couple the processor(s) 201 to the memory 202. One or more memory management units (MMUs) may reside between the processor(s) 201 and the memory 202 and facilitate accesses to the memory 202 requested by the processor(s) 201. The memory 202 may include one or more memories. The memory 202 may be random access memory (RAM).

The storage 203 stores data and/or instructions. As an example and not by way of limitation, the storage 203 may include a hard disk drive, a floppy disk drive, flash memory, an optical disc, a magneto-optical disc, magnetic tape, or a Universal Serial Bus (USB) drive or a combination of two or more of these. In some embodiments, the storage 203 is a removable medium. In some embodiments, the storage 203 is a fixed medium. In some embodiments, the storage 203 is internal to the mobile computing device 200. In some embodiments, the storage 203 is external to the mobile computing device 200. In some embodiments, the storage 203 is non-volatile, solid-state memory. In some embodiments, the storage 203 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 203 may include one or more memory devices.

One or more program modules stored in the storage 203 may be configured to cause various operations and processes described herein to be executed. For example, in some embodiments, the storage 203 stores instructions for maintaining, at the mobile computing device 200, a record associated with a print job submitted to a first printing device, the record including information for locating the first printing device and information that identifies the print job; and sending, from the mobile computing device 200 to a second printing device, a message that includes the information for locating the first printing device and the information that identifies the print job, the message comprising a request to execute the print job at the second printing device, or a combination of these, in accordance with embodiments described herein. In some embodiments, the application 402 resides in the storage 203 and executes on the mobile computing device 200.

The storage 203 also stores other programs and data to be processed. For example, the storage 203 stores an operating system including programs and data for managing hardware and software components of the mobile computing device 200. Applications on the mobile computing device 200 may utilize the operating system to perform various operations. The storage 203 may further store other programs and/or drivers that enable various functions of the mobile computing device 200, GUI functions, and/or processor functions. The storage 203 may also store data files including, for example, print data, image data, user data, configuration information, GUI components, such as graphical elements or templates, or other data required by the mobile computing device 200.

The I/O interface 204 includes hardware, software, or both providing one or more interfaces for communication between the mobile computing device 200 and one or more I/O devices. The mobile computing device 200 may include one or more of these I/O devices, where appropriate. One or more of these I/O devices may enable communication between a person and the mobile computing device 200. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 204 includes one or more device or software drivers enabling the processor(s) 201 to drive one or more of these I/O devices. The I/O interface 204 may include one or more I/O interfaces.

The communication interface 205 includes hardware, software, or both providing one or more interfaces for communication (such as, for example, packet-based communication) between the mobile computing device 200 and one or more other computing systems or one or more networks. As an example and not by way of limitation, the communication interface 205 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 205 for it. As an example and not by way of limitation, the mobile computing device 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the mobile computing device 200 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The mobile computing device 200 may include any suitable communication interface 205 for any of these networks, where appropriate. The communication interface 205 may include one or more communication interfaces 205.

The communication interface 205 may further include a near field communication (NFC) device, providing close range communication capabilities. The NFC device may include an antenna that allows for close range communication at relatively low data rates (e.g., 424 kb/s). In some embodiments, the NFC device may also allow for close range communication at relatively high data rates (e.g., 560 Mbps). In some embodiments, communication using an NFC device may occur within a range of approximately 2 to 4 cm, or, in some embodiments, the communication distance may be up to about 10 cm. As will be appreciated by those skilled in the art, close range communication using an NFC device may take place via magnetic field induction, thus allowing the NFC device to communicate with other NFC-enabled devices or to retrieve information from tags having radio frequency identification (RFID) circuitry. Additionally, magnetic field induction may also allow an NFC device to induce another NFC-enabled device that is in a passive or sleep mode into an active mode. The NFC device may exist as a stand-alone component or may be integrated into another chipset. An NFC device may operate using one or more protocols, such as the Near Field Communication Interface and Protocols (e.g., NFCIP-1), for communicating with another NFC-enabled device. The protocols may be used to adapt the communication speed and to designate one of the connected devices as an initiating device that controls and/or initiates the NFC connection.

The bus 206 interconnects various components of the mobile computing device 200 thereby enabling the transmission of data and execution of various processes. The bus 206 may include one or more types of bus structures including a memory bus or memory controller, a peripheral bus, and a local bus using any of a variety of bus architectures.

Figure 3A:
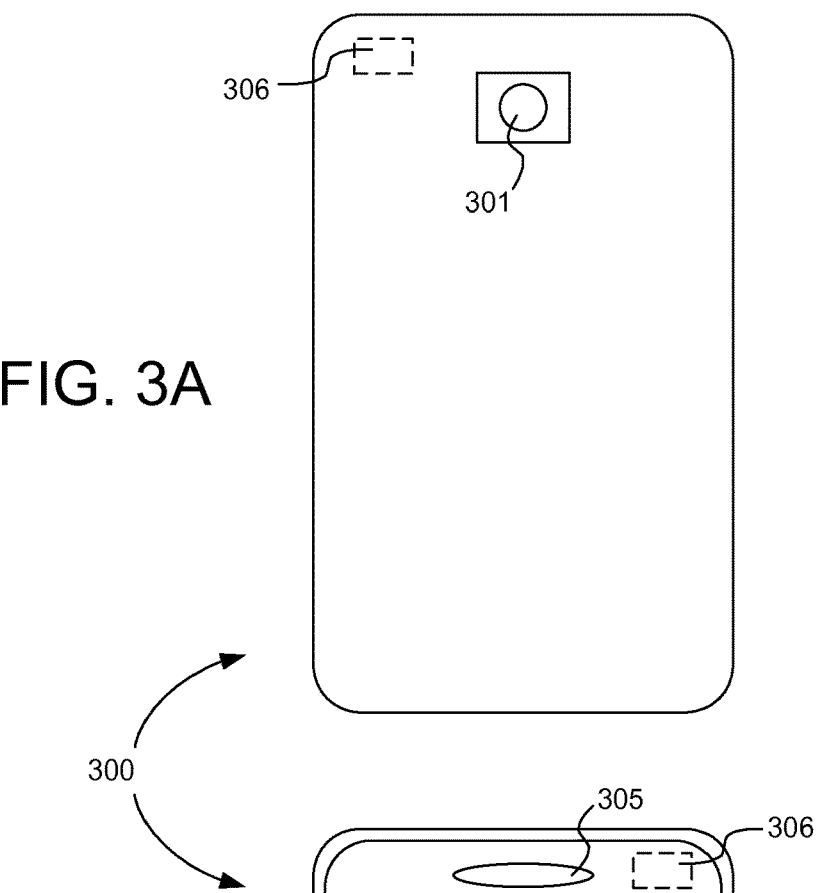
FIGS. 3A and 3B illustrate an example mobile computing device.
Figure 3B:
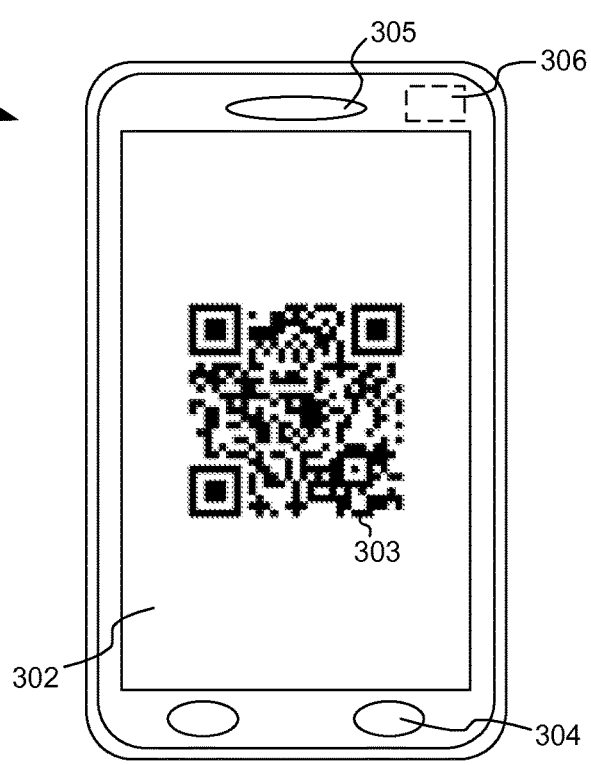

FIGS. 3A and 3B illustrate an example mobile computing device 300. The example mobile computing device 300 is one concrete example of the mobile computing device 200 described above with respect to FIG. 2.

FIG. 3A shows a rear view of the example mobile computing device 300 and FIG. 3B shows a front view of the example mobile computing device 300. The mobile computing device 300 includes a reading unit 301 (including a camera), a display 302, hard keys 304, a speaker 305, and an NFC device 306 located within the enclosure of the mobile computing device 300. Although FIGS. 3A and 3B show a particular configuration of features of the mobile computing device 300, one or more of the features could be differently arranged. For example, the reading unit 301 may be disposed on the front of the mobile computing device 300 and/or could be disposed in a different location on the front or back of the mobile computing device 300. Other components, such as the speaker 305 or hard keys 304, could also be differently arranged. Furthermore, the mobile computing device 300 may include more or less features than illustrated. For example, the mobile computing device 300 may include multiple reading units, and/or more or less hard keys 304 than shown.

The reading unit 301 is an I/O device of the mobile computing device 300. The reading unit 301 includes a camera for acquiring an image and may additionally include image processing circuitry for processing an acquired image. In some embodiments, the reading unit 301 acquires digital still or moving images, such as digital photographs or movies. In some embodiments, the reading unit 301 may be utilized in conjunction with application software in order to acquire an image of a machine-readable code (e.g., a two-dimensional barcode) and decode the machine-readable code in order for the mobile computing device 300 to obtain information encoded in the machine-readable code.

The display 302 is an I/O device of the mobile computing device 300. In some embodiments, the display 302 includes a liquid crystal display (LCD) and backlight which allow for output operations such as presenting information in a GUI. In some embodiments, the display 302 includes a touch sensitive element operable to receive user inputs or commands based on the touching of interface elements presented in a GUI on the display 302. The interface element may be a graphical object displayed on the display 302.

In some embodiments, the display 302 may display an image based on image data acquired by the reading unit 301. For example, the reading unit 301 may be used to capture a machine-readable code image displayed on the display of the operation panel 106 of the printing device 100. When the reading unit 301 acquires the image data, the display 302 may be configured to output the digital image data as a machine-readable code image 303 on the display 302.

The hard keys 304 are I/O devices of the mobile computing device 300. A user may provide user inputs by pressing one or more of the hard keys 304. Other user interface implementations may also be utilized. For example, hard keys or buttons may be arranged differently. Further by way of example, input structures on the mobile computing device 300 may exist in various forms including buttons, keys, control pads, and so forth, depending on specific implementation requirements.

The speaker 305 is an I/O device for transmitting audio signals, such as voice data received during a telephone call.

The NFC device 306 is a communication interface located within the enclosure of the mobile computing device 300. The NFC device 306 may be used to facilitate near-field wireless communication and data transfer between the mobile computing device 300 and another NFC-enabled device.

The mobile computing device 300 may further include one or more suitable communication interfaces for communicating with other computing devices and/or networks. As an example and not by way of limitation, the mobile computing device 300 may be configured to communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the mobile computing device 300 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these.

Figure 4:
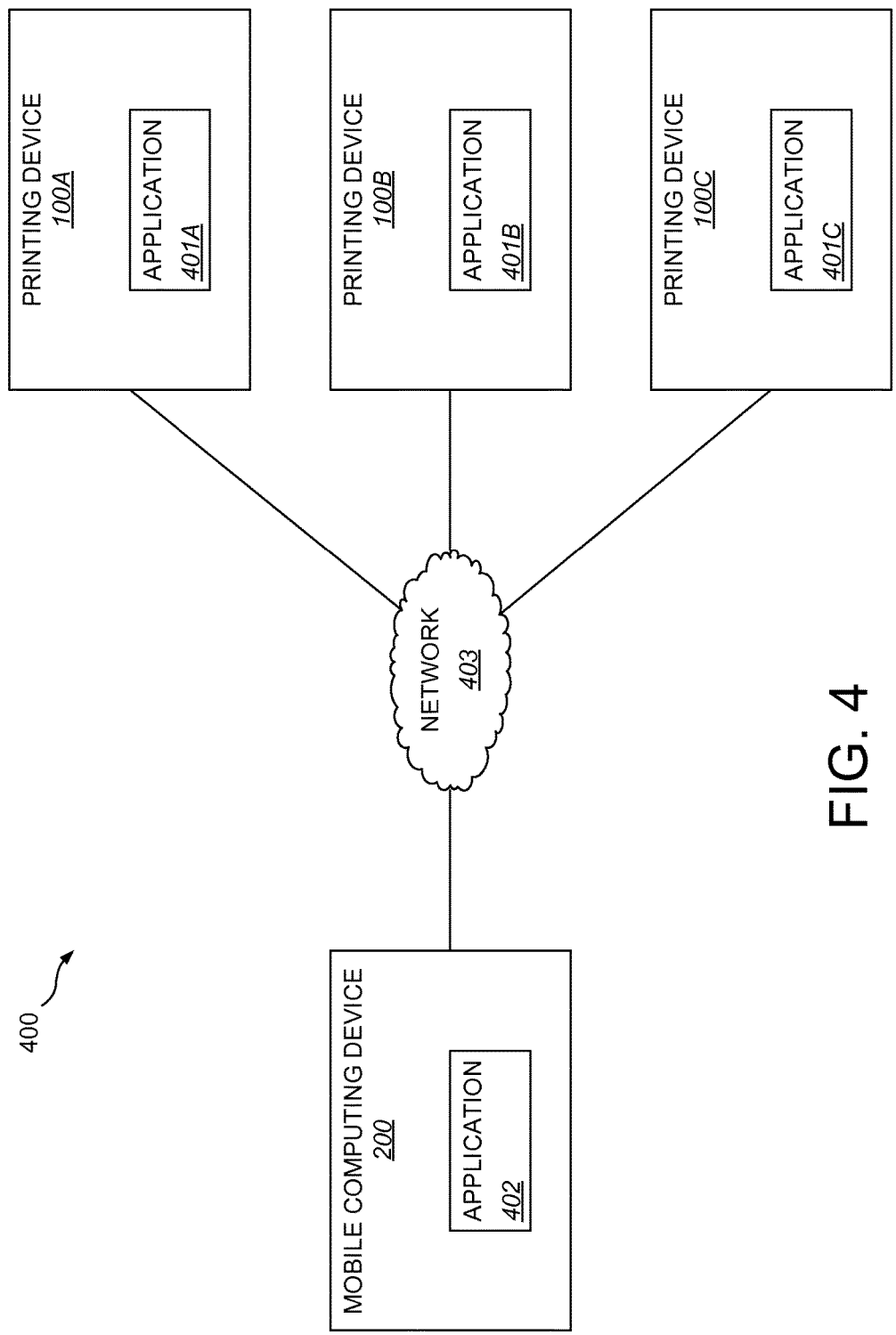
FIG. 4 illustrates an example network environment.

FIG. 4 illustrates an example network environment 400. A printing device 100A having an application 401A, a printing device 100B having an application 401B, a printing device 100C having an application 401C, and the mobile computing device 200 having an application 402 are connected to a network 403. According to various embodiments, all or a portion of the description of the printing device 100 of FIG. 1 is applicable to all or a portion of one or more of the printing device 100A, the printing device 100B and the printing device 100C of FIG. 4.

The printing device 100A includes hardware, software, or both for providing the functionality of the printing device 100A. In some embodiments, the printing device 100A performs one or more steps of one or more methods described or illustrated herein. In some embodiments, the printing device 100A provides functionality described or illustrated herein. In some embodiments, software running on the printing device 100A performs one or more steps of one or more methods described or illustrated herein or provides functionality described or illustrated herein. Some embodiments include one or more portions of the printing device 100A.

The printing device 100A includes hardware, software, or both for providing printing functionality. In some embodiments, the printing device 100A executes a printing operation based on a print job. For example, print data that is included in the print job may be processed at the printing device 100A to generate printed text or images on one or more sheets of paper according to the print data. The print data may be any printable data. The print data may be an electronic document, a text file, an image file, or other suitable data. In some embodiments, the print data is a portable document format (PDF) file. In some embodiments, the print data is a Hyper Text Markup Language (HTML) file. The print data may also be a file in a file format such as JPEG, GIF, BMP, PNG, or TIFF. The print data may include page description language (PDL) data, for example Post-Script, Printer Command Language (PCL), XML Paper Specification (XPS), or other suitable PDL. In some embodiments, the printing device 100A converts the file format of the print data from a first file format to a second file format different from the first file format, and executes the printing operation based on the converted print data. In some embodiments, the printing device 100A executes the printing operation based on the print data included in the print job without converting a file format of the print data.

In some embodiments, the printing device 100A receives a print job that includes the print data to be printed and, additionally, print setting information pertaining to the print job. The print setting information may include information indicating, for example, number of copies, print range, paper size, page orientation, page layout, color or black and white, single-sided or double-sided, finishing options, or other setting information for executing the printing operation. Accordingly, in some embodiments, the printing device 100A executes the printing operation based on the print data included in the print job and based on print setting information pertaining to the print job.

The application 401A includes programs and related data. In some embodiments, the application 401A executing on the printing device 100A performs one or more steps of one or more methods described or illustrated herein or provides functionality described or illustrated herein. By way of example and not by way of limitation, programs of the application 401A may include instructions that, when executed by one or more processors, cause the one or more processors to perform one or more operations described with respect to one or more of FIG. 10 and FIG. 11.

The above description of the printing device 100A and the application 401A also applies to the printing device 100B and the application 401B, respectively. Moreover, the above description of the printing device 100A and the application 401A also applies to the printing device 100C and the application 401C, respectively. In some embodiments, the printing device 100A, the printing device 100B, and the printing device 100C are configured to interact with each other. For example, the printing device 100A, the printing device 100B, and the printing device 100C may communicate with each other to transmit data between the respective printing devices. In some embodiments, the mobile computing device 200 is configured to interact with one or more of the printing device 100A, the printing device 100B, and the printing device 100C. The printing device 100A, the printing device 100B, the printing device 100C, and the mobile computing device 200 may use any suitable protocol(s), standard(s), data exchange format(s), or combination(s) of these, to communicate with and send/receive information to/from each other.

The mobile computing device 200 includes hardware, software, or both for providing the functionality of the mobile computing device 200. In some embodiments, the mobile computing device 200 performs one or more steps of one or more methods described or illustrated herein. In some embodiments, the mobile computing device 200 provides functionality described or illustrated herein. In some embodiments, software running on the mobile computing device 200 performs one or more steps of one or more methods described or illustrated herein or provides functionality described or illustrated herein. Some embodiments include one or more portions of the mobile computing device 200.

The mobile computing device 200 includes hardware, software, or both for requesting execution of a printing operation. In some embodiments, the mobile computing device 200 sends a print job to a printing device. The print job may include print data to be processed at a printing device to generate printed text or images on one or more sheets of paper according to the print data. The print data may be any printable data. The print data may be an electronic document, a text file, an image file, or other suitable data. In some embodiments, the print data is a PDF file. In some embodiments, the print data is a HTML file. The print data may also be a file in a file format such as JPEG, GIF, BMP, PNG, or TIFF. The print data may include PDL data, for example PostScript, PCL, XPS, or other suitable PDL. In some embodiments, the mobile computing device 200 converts the file format of a file from a first file format to a second file format different from the first file format. The mobile computing device 200 may then send the converted file in the second file format to a printing device to be printed. For example, the mobile computing device 200 may generate and send a print job that includes the converted file as the print data. In some embodiments, the mobile computing device 200 sends to a printing device a print job without having converted a file format of the print data included in the print job.

In some embodiments, the mobile computing device 200 generates a print job that includes print data to be printed and, additionally, print setting information pertaining to the print job. The print setting information may include information indicating, for example, number of copies, print range, paper size, page orientation, page layout, color or black and white, single-sided or double-sided, finishing options, or other setting information for executing the printing operation. Accordingly, in some embodiments, the mobile computing device 200 sends to a printing device a print job that includes the print data and print setting information.

The application 402 includes programs and related data. In some embodiments, the application 402 executing on the mobile computing device 200 performs one or more steps of one or more methods described or illustrated herein or provides functionality described or illustrated herein. By way of example and not by way of limitation, programs of the application 402 may include instructions that, when executed by one or more processors, cause the one or more processors to perform one or more operations described with respect to one or more of FIG. 6 and FIG. 8.

The network 403 couples one or more servers and one or more clients to each other. The network 403 may be any suitable network. For example, one or more portions of the network 403 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 403 may include one or more networks.

Figure 5:
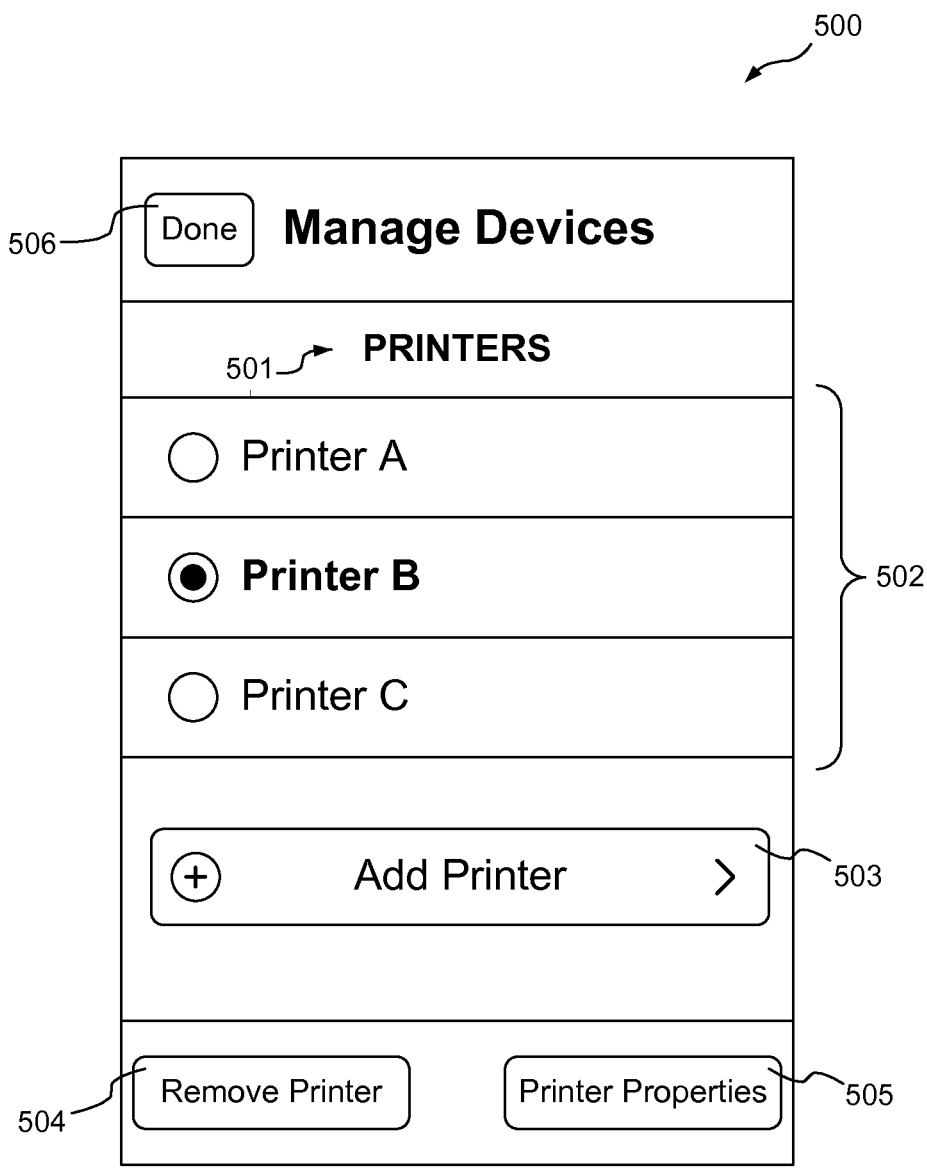
FIG. 5 illustrates an example graphical user interface on a display of a mobile computing device.

FIG. 5 illustrates an example GUI 500 on the display of the mobile computing device 200. The example GUI 500 includes interface elements enabling a user to manage printers. In some embodiments, the application 402 executing on the mobile computing device 200 presents the example GUI 500 on the display of the mobile computing device 200. By way of example and not by way of limitation, the example GUI 500 may be presented in response to one or more user inputs indicating selection of an interface element and/or when one or more predefined criteria are met. The example GUI 500 includes Printer Information 501, a list of printers 502, radio buttons each associated with a respective printer in the list of printers 502, an Add Printer bar 503, a Remove Printer button 504, a Printer Properties button 505, and a Done button 506.

The Printer Information 501 includes textual information that identifies the current screen presented on the display. The text indicates a category of items ("PRINTERS") presented on the display.

The list of printers 502 includes respective graphical elements having textual information identifying a printer name ("Printer A" and "Printer B" and "Printer C") for each printing device represented in the list of printers 502. Each graphical element represents a respective printing device registered on the mobile computing device 200. For each registered printing device, the mobile computing device 200 stores information associated with the printing device.

Registration of a printing device on the mobile computing device 200 may be performed in any suitable manner. In some embodiments, registering a printing device on the mobile computing device 200 includes obtaining, at the mobile computing device 200, information associated with the printing device. In some embodiments, the information associated with the printing device is usable by the mobile computing device 200 to establish a communication session between the mobile computing device 200 and the printing device. By way of example and not by way of limitation, the information usable to establish a communication session with the printing device may include information that identifies the printing device, information for locating the printing device, information for accessing the printing device such as credential information or information for connecting to a network, or other suitable information usable to establish a communication session between the mobile computing device 200 and the printing device. In some embodiments, the information associated with the printing device includes one or more of an IP address, a hostname, a MAC address, or other suitable information to identify, locate or communicate with the printing device. After obtaining the information associated with the printing device, the mobile computing device 200 may store the information in a data structure such that the information is associated with the registered printing device in the data structure.

The Add Printer bar 503 provides functionality to present one or more interface elements enabling a user to register a printing device on the mobile computing device 200. For example, in response to a user input indicating selection of the Add Printer bar 503, the mobile computing device 200 may present a screen including a graphical button operable when selected to initiate a process of registering a printing device. In some embodiments, the mobile computing device 200 presents multiple interface elements, each representing a respective method of registering a printing device on the mobile computing device 200. A user may provide an input by touching one of the interface elements indicating selection of a method of registering a printing device from among the multiple methods. For example, the mobile computing device 200 may implement one or more of the following methods to register a printing device: search for a network-connected printer, search for a printer having an identifier that matches a user-provided identifier, read and decode machine-readable code generated by the printer, receive a message output from an NFC transceiver of the printer, or other suitable method for obtaining information associated with a printing device.

The process of registering a printing device on the mobile computing device 200 may vary according to the method being implemented. On the other hand, the information stored on the mobile computing device 200 when registration is completed does not vary according to the method being implemented, according to some embodiments.

In some embodiments, the mobile computing device 200 registers a printing device by searching for printers connected to the network 403. For example, the mobile computing device 200 may search for network printers and discover the printing device 100A, the printing device 100B, and the printing device 100C. The discovered printers may be represented in a list on the display of the mobile computing device 200. The list may include respective interface elements for each printer including textual information specifying printer name or other identifier. The interface elements may be selected by a user input to the interface element in order to select the printing device to be registered. Once selected, the mobile computing device 200 stores information associated with the registered printing device. The information associated with the printing device may be usable to establish a communication session between the mobile computing device 200 and the registered printing device.

In some embodiments, the mobile computing device 200 registers a printing device using a user-provided identifier. For example, the mobile computing device 200 receives the identifier based on one or more input(s) via the I/O interface 204. For example, a user may touch one or more hard keys and/or one or more interface elements on a touch screen of the mobile computing device 200 in order to enter a string of characters. Then the mobile computing device 200 searches for a printing device having an identifier that matches the string of characters entered. In response to determining the string of characters matches an identifier of a printing device, the mobile computing device presents an interface element on the display of the mobile computing device 200, the interface element representing the matching printing device, and including textual information specifying printer name or other identifier. The interface elements may be selected by a user input to the interface element in order to register the printing device. Once selected, the mobile computing device 200 stores information associated with the registered printing device. The information associated with the printing device may be usable to establish a communication session between the mobile computing device 200 and the registered printing device.

In some embodiments, the mobile computing device 200 registers a printing device by reading and decoding machine-readable code generated by a printing device. For example, a user may enter a command at a printing device by providing one or more inputs at an operation panel. Based on the command, the printing device may perform operations to generate a machine-readable code. In some embodiments, an application executing on the printing device generates the machine-readable code and presents the machine-readable code on the display of the printing device. The machine-readable code may be any suitable barcode able to encode the information to be provided to the mobile computing device 200 for registering the printing device. For example, the machine-readable code may be a two-dimensional barcode, such as a QR code. The machine-readable code may encode information associated with the printing device, which may be usable to establish a communication session between the mobile computing device 200 and the registered printing device. In some embodiments, the mobile computing device 200 is configured to obtain the information encoded in the machine-readable code. For example, the mobile computing device 200 acquires an image of the machine-readable code using the I/O interface 204 and decodes the machine-readable code to obtain the information encoded in the machine-readable code. Then the mobile computing device 200 stores the information associated with the registered printing device. The information associated with the printing device may be usable to establish a communication session between the mobile computing device 200 and the registered printing device.

In some embodiments, the mobile computing device 200 registers a printing device using a message output from an NFC transceiver of the printing device. For example, a user may enter a command at a printing device by providing one or more inputs at an operation panel. Based on the command, the printing device may perform operations to output a message by way of near-field communication. In some embodiments, an application executing on the printing device generates the message to be output in accordance with NFC standards covering data exchange format and communication protocols. In some embodiments, the message is output from an NFC transceiver (e.g., an NFC reader) connected to or included in the printing device. In some embodiments, an application executing on the printing device may prompt the user to bring a NFC-enabled device into close proximity with the NFC transceiver of the printing device to receive information output from the NFC transceiver of the printing device. For example, textual information may be presented on a display of the printing device to prompt the user. According to some embodiments, the mobile computing device 200 is a NFC-enabled device that receives the message output by way of near-field communication to obtain the information for registering the printing device. Then the mobile computing device 200 stores the information associated with the registered printing device. The information associated with the printing device may be usable to establish a communication session between the mobile computing device 200 and the registered printing device.

The Remove Printer button 504 provides functionality to delete information associated with a designated printer. Each radio button is an interface element associated with a respective printer. By selecting the radio button associated with a printer, a user may designate the printer corresponding to the designated radio button as a selected printer. For example, in response to a user input indicating selection of the radio button associated with the printer having "Printer B" as a printer name, the mobile computing device 200 may present the designated radio button, as shown in FIG. 5. The designated radio button may include a dot or other mark to present the radio button associated with the printer labeled "Printer B" as a designated interface element. Accordingly, in response to selection of the Remove Printer button 504 while "Printer B" is designated as the selected printer, the graphical element identifying the printer name "Printer B" would be removed from the list of printers 502; and the information associated with the printer having the name "Printer B" would be deleted from the mobile computing device 200. For example, an IP address of the printer identified as "Printer B" may be deleted from the mobile computing device 200.

On the other hand, in response to selection of the Printer Properties button 505 while "Printer B" is designated as the selected printer, information about the printer identified as "Printer B" would be presented on the display of the mobile computing device 200. For example, the mobile computing device 200 may present a screen or a window having any suitable information associated with the printer such as identification information, location information, information indicating capabilities of the printer (e.g., color printing, duplex printing), available finishing options (e.g., stapling), or other suitable information associated with the printer.

The Done button 506 provides functionality to exit the "PRINTERS" screen without modifying the list of printers 502 or the respective information, such as IP addresses, associated with the printers represented in the list of printers 502.

In some embodiments, the printing device 100A, the printing device 100B, and the printing device 100C of FIG. 4 are registered on the mobile computing device 200. In some embodiments, the printer name "Printer A" in the example GUI 500 represents the printing device 100A; and information associated with the printing device 100A, such as the IP address of the printing device 100A, is stored on the mobile computing device 200. In some embodiments, the printer name "Printer B" in the example GUI 500 represents the printing device 100B; and information associated with the printing device 100B, such as the IP address of the printing device 100B, is stored on the mobile computing device 200. In some embodiments, the printer name "Printer C" in the example GUI 500 represents the printing device 100C; and information associated with the printing device 100C, such as the IP address of the printing device 100C, is stored on the mobile computing device 200.

Figure 6:
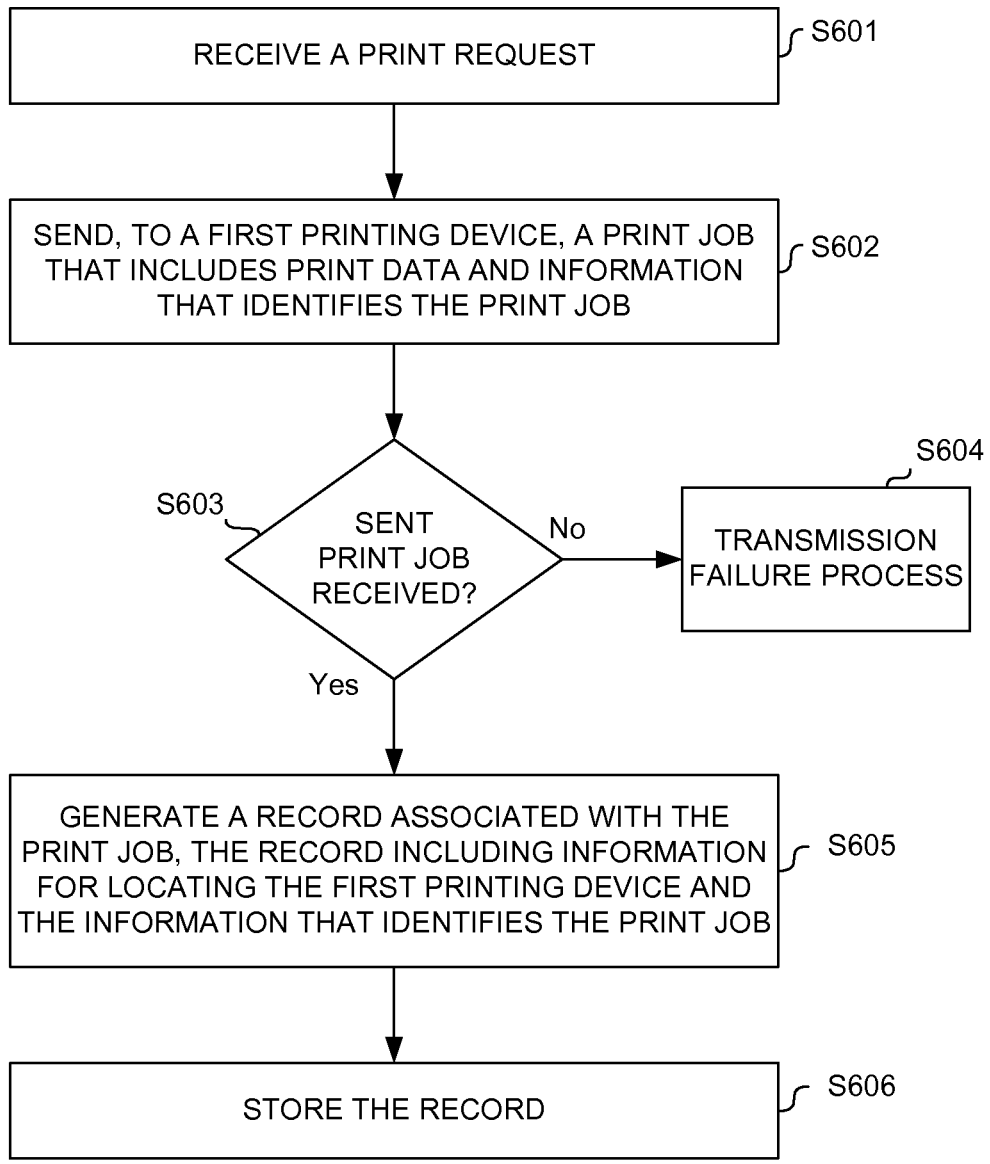
FIG. 6 illustrates an example flow of operations at a mobile computing device.

FIG. 6 is described with reference to the example network environment 400 of FIG. 4. FIG. 6 illustrates an example flow of operations at the mobile computing device 200. One or more of the steps of FIG. 6 may be performed based on or in accordance with default settings for the application 402, a predetermined policy, one or more inputs indicating one or more user selections, or a combination of two or more of these.

In step S601, the mobile computing device 200 receives a print request. In some embodiments, the print request includes an instruction to send print data to a printing device. The print request may be submitted to the mobile computing device 200 in any suitable manner. For example, the print request may be based on one or more user inputs received via the I/O interface 204 of the mobile computing device 200.

In some embodiments, the mobile computing device 200 includes one or more features of the mobile computing device 300 shown in FIG. 3B, such as the hard keys 304 and the display 302 having a touch sensitive element operable to receive user inputs or commands based on the touching of interface elements presented in a GUI on the display 302. In some embodiments, the print request is based on one or more inputs received via a hard key of the mobile computing device 200. For example, a user may press one or more hard keys in order to submit the print request. In some embodiments, the print request is based on one or more inputs received via a touch screen of the mobile computing device 200. For example, the user may touch an interface element displayed on the touch sensitive display in order to submit the print request.

In some embodiments, step S601 includes receiving an instruction at the mobile computing device 200 to send print data to a printing device. The print data may be any printable data. Moreover, the print data may be designated as the data to be printed by any suitable method. For example, the print data may be a file presented on the display of the mobile computing device or otherwise designated as a selected file when the user submits the print request based on one or more inputs.

Additionally, the printing device to which the mobile computing device 200 is to send the print data may be selected by any suitable method. For example, the printing device may be selected based on user selection, based on setting information, based on determining which printing device satisfies predetermined criteria, or other suitable method for selecting the printing device.

In some embodiments, a printing device is selected by a user based on one or more inputs indicating the selection of the printing device. For example, a user may provide an input by touching an interface element presented on the display of the mobile computing device 200 to select the printing device represented by the interface element. Then, the user may submit the print request of step S601 based on one or more user inputs via the I/O interface 204 of the mobile computing device 200.

In some embodiments, a printing device is designated in setting information as a default printer. For example, the settings of the mobile computing device 200 may include a setting designating the printing device as the default printer, and the mobile computing device 200 may receive a print request for which print data is to be sent to the default printer.

In some embodiments, the mobile computing device 200 determines a destination to send the print data. For example, the mobile computing device 200 may determine the destination by sending a message including one or more requests or queries to one or more printing devices. In some embodiments, the mobile computing device 200 sends the message to multiple printing devices simultaneously. The multiple printing devices may be all the printing devices registered on the mobile computing device 200 or a predetermined set of printing devices. The message may include, for example, a request for information relating to a capacity of the printing device(s) to execute the printing operation, a request for information indicating availability of the printing device(s), a request for information indicating the capabilities/attributes of the printing device(s), or other suitable request. In some embodiments, the mobile computing device 200 sends the message to one or more printing devices successively in a predetermined order, instead of to multiple devices simultaneously. In some embodiments, a user provides one or more inputs to cause the mobile computing device 200 to send the message to one or more specified printing devices according to the user inputs. The mobile computing device may then receive one or more response(s) to the message. Based on the response(s) received from the printing device(s), the mobile computing device 200 may determine a printing device to which the mobile computing device 200 is to send the print data.

In step S602, the mobile computing device 200 sends a print job to a printing device in response to the print request received in step S601. By way of example and not by way of limitation, the print job may include the print data, information that identifies the print job, print setting information, or a combination of two or more of these.

The print job may include any printable print data. In some embodiments, the print data includes one or more files generated at the mobile computing device 200. In some embodiments, the print data includes one or more files which were transmitted to the mobile computing device 200. In some embodiments, one or more files are converted to another format before the converted file(s) is/are sent to a printing device as the print data. In some embodiments, the mobile computing device 200 sends one or more files to a printing device as print data without converting a file format of the one or more files.

The print job may include information that identifies the print job. The information that identifies the print job may be a print job identifier. In some embodiments, the information that identifies the print job is a unique identifier. In some embodiments, the information that identifies the print job is a randomly or pseudo-randomly generated string of characters. The application 402 executing on the mobile computing device 200 may generate the information that identifies the print job. In some embodiments, step S602 includes using a service to perform one or more operations. For example, the application 402 executing on the mobile computing device 200 may send a request to a service to generate all or a portion of the information to be used for identifying the print job. The service may include a random number generator or a pseudo-random number generator. In response to the request, the service may generate the requested data and send the generated data to the application 402. The application 402 executing on the mobile computing device 200 may then use the generated data as the information that identifies the print job or as a portion of the information that identifies the print job. In some embodiments, the mobile computing device 200 obtains data from a service and performs one or more operations on the data or otherwise uses the data to generate the information that identifies the print job.

The print job may include print setting information pertaining to the print job. The print setting information may include information indicating, for example, number of copies, print range, paper size, page orientation, page layout, color or black and white, single-sided or double-sided, finishing options, or other setting information for executing the printing operation. The print setting information may include one or more settings that are based on one or more user selections. The print setting information may include one or more settings that are default settings.

In some embodiments, the mobile computing device 200 sends the print job to a printing device based on the print request received in step S601. In some embodiments, step S602 includes sending the print job to a specified printing device. For example, the mobile computing device 200 may send the print job to a printing device based on a user input designating the printing device as the selected printing device. In some embodiments, step S602 includes sending the print job to a printing device based on setting information. For example, a printing device may be selected because it is set as the default printer. In some embodiments, step S602 includes sending the print job to a printing device based on a prior determination in which the mobile computing device 200 determined a printing device to use for a print job based on the relative capacity, availability, or capability of respective printing devices.

In some embodiments, step S602 includes storing information relating to the print job. The information relating to the print job may be stored in any suitable memory or storage location. For example, the mobile computing device 200 may store information relating to the print job in a cache memory, or other suitable memory or storage location. The information relating to the print job may include information about the print job or information that is included in the print job. By way of example and not by way of limitation, the information relating to the print job may include information for locating the printing device to which the print job was sent in step S602, the information that identifies the print job, information that identifies a file in the print job (e.g., a file name), information that identifies a user (e.g., a username), a time stamp, or other suitable information relating to the print job.

In step S603, the mobile computing device 200 determines whether the print job sent in step S602 was received by the printing device. For example, the mobile computing device 200 may receive a message indicating receipt of the print job. The message may be an acknowledgement sent from the printing device that received the print job. The message may include any suitable information such as information associated with the print job, information associated with the printing device that received the print job, information associated with the mobile computing device 200, information associated with the communication session between the mobile computing device 200 and the printing device that received the print job, or other suitable information. In step S603, any suitable method may be used for determining whether the print job was received by the printing device to which the print job was sent in step S602.

In some embodiments, the mobile computing device 200 determines, based on the message indicating receipt of the print job, that the print job was received by the printing device to which the print job was sent in step S602. By way of example, the printing device determined to have received the print job sent in step S602 may be the printing device 100A, the printing device 100B, or the printing device 100C of FIG. 4 having the application 401A, the application 401B, or the application 401C, respectively, executing thereon. In some embodiments, upon receipt of the print job sent in step S602, the printing device determined to have received the print job stores the print job on the printing device without executing a printing operation based on the print job.

Still referring to step S603, the mobile computing device 200 may receive a message indicating transmission of the print job failed. By way of example, transmission of the print job may have failed due to a network connection error. Further by way of example, receiving the print job at the printing device may require an authentication process, and authentication failure may preclude transmission of the print job.

In step S603, in response to determining that the print job sent in step S602 was not received by the printing device (No in step S603), the process advances to step S604. In step S604, a transmission failure process is performed in response to the transmission failure. For example, the mobile computing device 200 may generate and present a message on the display of the mobile computing device 200 indicating, for example, that transmission of the print job failed, or that the user is denied access to the printing device to which the print job was sent. The message may include a request that the user retry transmission of the print job, or provide a credential for authentication, for example. On the other hand, in response to determining that the print job sent in step S602 was received by the printing device (Yes in step S603), the process advances to step S605.

In step S605, the mobile computing device 200 generates a record associated with the print job sent in step S602. In some embodiments, the record generated at step S605 includes information for locating the printing device to which the print job was sent in step S602. In some embodiments, the record generated at step S605 includes the information that identifies the print job which was included in the print job sent in step S602. In some embodiments, the record generated at step S605 includes both the information for locating the printing device to which the print job was sent in step S602, and the information that identifies the print job. In some embodiments, one or more programs of the application 402 include instructions for generating the record.

Referring to the information included in the record generated in step S605, the information for locating the printing device is any suitable information for locating the printing device to which the print job was sent in step S602. In some embodiments, the information for locating the printing device is usable to establish a communication session between the mobile computing device 200 and the printing device to which the print job was sent in step S602. In some embodiments, the information for locating the printing device is useable to identify the printing device to which the print job was sent in step S602. In some embodiments, the information for locating the printing device is an IP address of the printing device to which the print job was sent in step S602. In some embodiments, the information for locating the printing device is a hostname of the printing device to which the print job was sent in step S602.

Referring to the information included in the record generated in step S605, in some embodiments, the information for locating the printing device matches information stored during a registration process such as described with reference to FIG. 5. In some embodiments, the printing device to which the print job was sent in step S602 is a printing device registered on the mobile computing device 200. For example, during registration, the mobile computing device 200 may have stored information associated with a printing device in a data structure such that the information is associated with the printing device in the data structure. For example, an IP address of a registered printing device may be associated with the registered printing device in the data structure. In some embodiments, step S605 includes retrieving the information associated with the registered printing device from a data structure and using the retrieved information as the information for locating the printing device. For example, step S605 may include accessing the data structure in which the information associated with the registered printing device is stored in order to retrieve the information associated with the printing device. Then the mobile computing device 200 may generate the record in step S605 using the information associated with the registered printing device as the information for locating the printing device.

In some embodiments, information included in the record generated in step S605 matches information that was stored in step S602 as information relating to the print job sent in step S602. For example, step S602 may include storing in a cache memory, or other suitable memory or storage location, information relating to the print job. In some embodiments, step S605 includes retrieving the information for locating the printing device from the cache memory, or other suitable memory or storage location, the information for locating the printing device having been stored in step S602. In some embodiments, step S605 includes retrieving the information that identifies the print job from the cache memory, or other suitable memory or storage location, the information that identifies the print job having been stored in step S602.

The information included in the record generated in step S605 may include information items in addition to the information for locating the printing device and the information that identifies the print job. By way of example and not by way of limitation, the record may include information that identifies a file included in the print job (e.g., a file name), information that identifies a user (e.g., a username), a time stamp, or other suitable information associated with the print job sent in step S602.

In step S606, the mobile computing device 200 stores the record generated in step S605. The record may be stored in a data store on the mobile computing device 200. The data store may be an area of memory or data storage that is managed by the application 402 and/or accessible to only the application 402. The application 402 executing on the mobile computing device 200 may store the record such that the information items included in the record are associated with each other in a data structure. Accordingly, information items which are associated with one print job are grouped as print job information in a single record representing the print job. Multiple records may be stored in the data store. Each record in the data store may be representative of a separate print job sent by the mobile computing device 200, and each record may include print job information associated with a respective print job.

In some embodiments, the records in the data store may be represented in a GUI on the display of the mobile computing device 200. The mobile computing device 200 may receive a request to access the print job information based on one or more inputs by a user. The application 402 executing on the mobile computing device 200 may, in response to the input(s), present a GUI including one or more graphical elements representing separate records. In some embodiments, the records represent print jobs which have been sent to a printing device. In some embodiments, the records represent print jobs which have been sent to a printing device and which have not been released. For example, a print job may be stored on a printing device to which the print job was sent in step S602, but a printing operation based on the print job has not been executed.

A printing operation may be executed at a printing device based on a print job corresponding to a record in the data store. In some embodiments, when a print job is released, the application 402 executing on the mobile computing device 200 removes the corresponding record from the data store.

In some embodiments, when a print job is released, the application 402 executing on the mobile computing device 200 does not remove the corresponding record from the data store. In some embodiments, when a print job is released, the application 402 executing on the mobile computing device 200 determines whether to remove the corresponding record from the data store. By way of example, the application 402 executing on the mobile computing device 200 may determine whether to remove the corresponding record from the data store based on or in accordance with one or more default settings of the application 402, a predetermined policy, one or more inputs indicating one or more user selections, or a combination of two or more of these. In some embodiments, when a print job is released, the application 402 executing on the mobile computing device 200 determines to remove the corresponding record from the data store based on information indicating deletion of the print job from the printing device to which the print job was sent in step S602.

In some embodiments, the application 402 executing on the mobile computing device 200 provides functionality to delete a record from the data store after a predetermined time period regardless of whether the print job corresponding to the record has been released. The application 402 executing on the mobile computing device 200 may, for example, periodically check time stamps of the records to determine whether a time period has expired. In some embodiments, the application 402 executing on the mobile computing device 200 initiates a timer in connection with an event such as the generation of a new record, the sending of a print job, or other suitable event associated with a new print job. The timer may expire after a predetermined time period. The application 402 executing on the mobile computing device 200 may monitor for an expiration of the timer and, base d expiration of the timer, may delete the relevant record from the data store.

Figure 7:
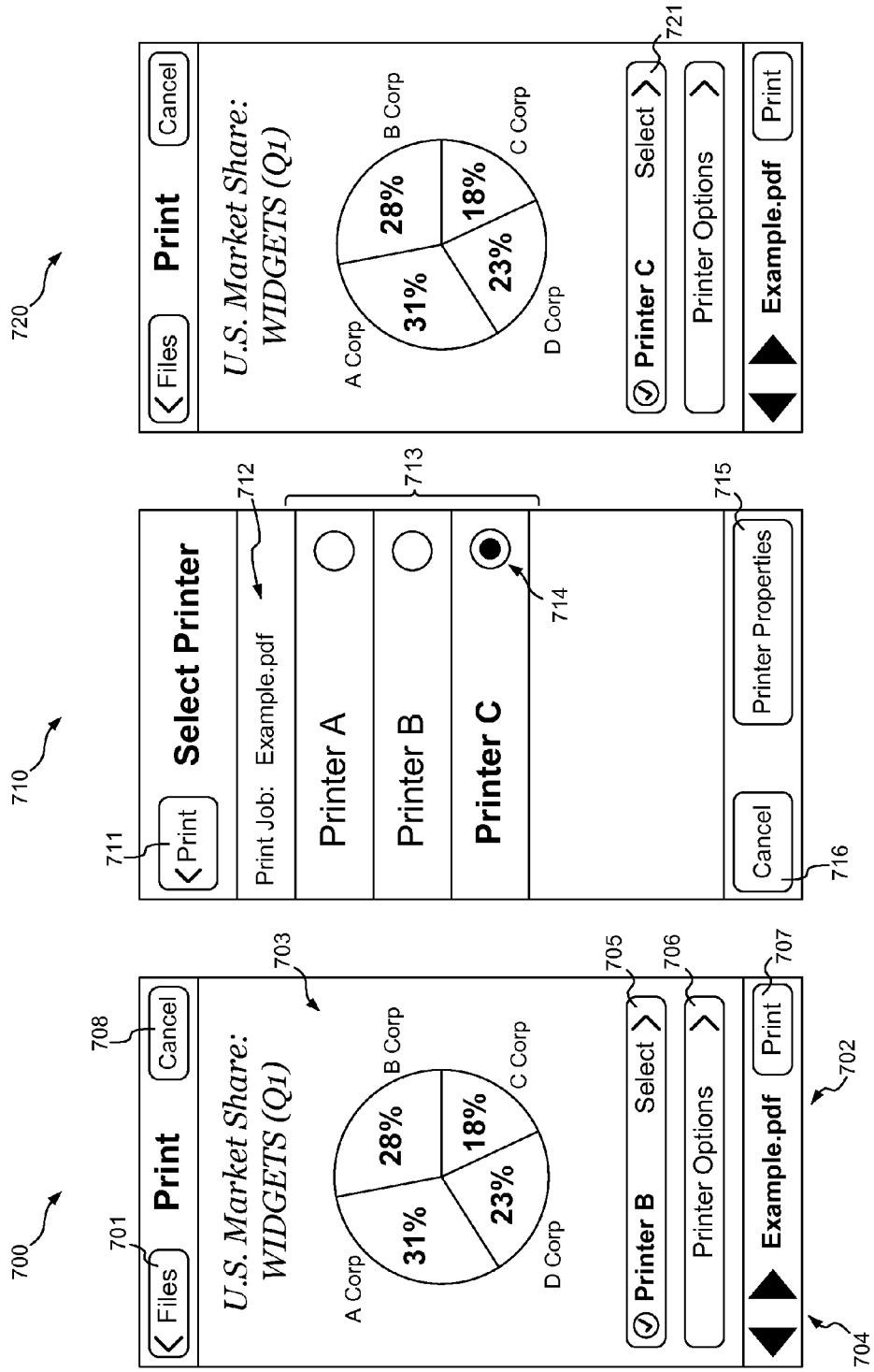
FIG. 7A illustrates an example graphical user interface on a display of a mobile computing device.
FIG. 7B illustrates an example graphical user interface on a display of a mobile computing device.
FIG. 7C illustrates an example graphical user interface on a display of a mobile computing device.

FIG. 7A illustrates an example GUI 700 on the display of the mobile computing device 200. The example GUI 700 includes interface elements enabling a user to issue a print request, and other commands relating to a displayed file. In some embodiments, the application 402 executing on the mobile computing device 200 presents the example GUI 700 on the display of the mobile computing device 200. By way of example and not by way of limitation, the example GUI 700 may be presented in response to one or more user inputs indicating selection of an interface element and/or when one or more predefined criteria are met. The example GUI 700 may be presented in response to a user input indicating selection of a file, a print icon, or other suitable command. The example GUI 700 includes a Files button 701, File Information 702, an image of the file 703, Back and Forward buttons 704, a Printer Selection bar 705, a Printer Options bar 706, a Print button 707, and a Cancel button 708.

The Files button 701 provides functionality to present a screen enabling a user to access saved files. A user input indicating selection of the Files button 701 may cause the "Print" screen presented in the example GUI 700 to close. The saved files may be arranged in any suitable manner and presented on the display in any suitable manner when the user accesses the saved files using the Files button 701. The File Information 702 includes textual information that identifies the file currently presented on the display. The text indicates the file name ("Example.pdf") of the file that is displayed. The image of the file 703 is presented on the display. The Back and Forward buttons 704 provide functionality to navigate backward and forward between files presented on the display based on user inputs to the respective buttons.

The Printer Selection bar 705 enables a user to select a printing device to which a print job is to be sent. The Printer Selection bar 705 includes textual information that identifies the printing device currently designated as the selected printing device. The text indicates the printing device having printer name "Printer B" is the selected printing device. In some embodiments, the Printer Selection bar 705 provides functionality to modify an existing setting by removing a printing device as the designated printer for a print job, and selecting an alternative printing device for the print job. In response to a user selecting the Printer Selection bar 705, the mobile computing device 200 may present one or more interface elements each representing a respective printing device available to be selected by the user for a print job. In some embodiments, in response to selection of the Printer Selection bar 705 (or the Printer Selection bar 721, described below with reference to FIG. 7C), a screen such as shown at FIG. 7B for selecting a printer is presented on the display of the mobile computing device 200.

The Printer Options bar 706 provides functionality for entering print settings in accordance with the capabilities of the printing device currently designated as the selected printing device in the Printer Selection bar 705. The Print button 707 enables a user to request that the mobile computing device 200 transmit a print job based on selection of the Print button 707. The Print button 707 provides functionality to initiate processing to send the print job to a specified printing device. In some embodiments, the mobile computing device 200 transmits a print job that includes the print data, the print setting information, and information that identifies the print job. The Cancel button 708 provides functionality to exit the "Print" screen without printing the displayed file, and without modifying print settings associated with the Printer Selection bar 705 and the Printer Options bar 706.

FIG. 7B illustrates an example GUI 710 on the display of the mobile computing device 200. The example GUI 710 includes interface elements enabling a user to select a printing device for a print job. In some embodiments, the application 402 executing on the mobile computing device 200 presents the example GUI 710 on the display of the mobile computing device 200. By way of example and not by way of limitation, the example GUI 710 may be presented in response to one or more user inputs indicating selection of an interface element and/or when one or more predefined criteria are met. In some embodiments, a screen such as shown at FIG. 7B for selecting a printer is presented in response to selection of the Printer Selection bar 705 (or the Printer Selection bar 721, described below with reference to FIG. 7C). The example GUI 710 includes a Return to Print button 711, File Information 712, a list of printers 713, radio buttons each associated with a respective printer, the radio buttons including a designated radio button 714, a Printer Properties button 715, and a Cancel button 716.

The Return to Print button 711 provides functionality to return to a "Print" screen. In some embodiments, in response to selection of the Return to Print button 711, a screen such as shown at FIG. 7A (or such as shown at FIG. 7C, described below) is presented on the display of the mobile computing device 200. In some embodiments, a user input indicating selection of the Return to Print button 711 may cause the "Select Printer" screen presented in the example GUI 710 to close. In some embodiments, a modification of an existing setting by removing a printing device as the designated printer for a print job, and selecting an alternative printing device for the print job is saved and maintained when the Return to Print button 711 is used to exit the "Select Printer" screen. The File Information 712 includes textual information that identifies a file on the mobile computing device 200 to be sent to a printing device selected at the example GUI 710.

The list of printers 713 includes respective graphical elements having textual information identifying a printer name ("Printer A" and "Printer B" and "Printer C") for each printing device represented in the list of printers 713. Each graphical element represents a respective printing device registered on the mobile computing device 200. Each radio button is an interface element associated with a respective printer. By selecting the radio button associated with a printer, a user may designate the printer corresponding to the designated radio button 714 as a selected printer. For example, in response to a user input indicating selection of the radio button associated with the printer having "Printer C" as a printer name, the mobile computing device 200 may present the designated radio button 714, as shown in FIG. 7B. The designated radio button 714 may include a dot or other mark to present the radio button associated with the printer labeled "Printer C" as a designated interface element. Accordingly, in response to selection of the Printer Properties button 715 while "Printer C" is designated as the selected printer, information about the printer identified as "Printer C" would be presented on the display of the mobile computing device 200. For example, the mobile computing device 200 may present a screen or a window having any suitable information associated with the printer such as identification information, location information, information indicating capabilities of the printer (e.g., color printing, duplex printing), available finishing options (e.g., stapling), or other suitable information associated with the printer.

The Cancel button 716 provides functionality to exit the "Select Printer" screen without modifying settings associated with the Printer. Accordingly, in some embodiments, a modification of an existing setting by removing a printing device as the designated printer for a print job, and selecting an alternative printing device for the print job, may not be saved or maintained when the Cancel button 716 is used to exit the "Select Printer" screen. In some embodiments, such information is maintained when the Cancel button 716 is used.

FIG. 7C illustrates an example GUI 720 on the display of the mobile computing device 200. In some embodiments, the application 402 executing on the mobile computing device 200 presents the example GUI 720 on the display of the mobile computing device 200. The example GUI 720 of FIG. 7C includes interface elements and features similar to those of the example GUI 700 of FIG. 7A, except that the Printer Selection bar 705 of FIG. 7A indicates "Printer B" is the selected printing device, while the Printer Selection bar 721 of FIG. 7C indicates "Printer C" is the selected printing device.

According to some embodiments, FIGS. 7A, 7B and 7C show example GUIs presented in response to various user inputs. By way of example, while the example GUI 700 of FIG. 7A is presented on the display of the mobile computing device 200, the mobile computing device 200 may receive an input indicating that a user has selected the Printer Selection bar 705. In response to the input, the mobile computing device 200 may present a GUI labeled "Select Printer" such as the example GUI 710 but with "Printer B" designated as the selected printing device. For example, the mobile computing device 200 may present a GUI that includes interface elements and features similar to those of the example GUI 710 of FIG. 7B, except that a designated radio button would be associated with "Printer B" instead of "Printer C." This is because "Printer B" is designated as the selected printing device, as shown in FIG. 7A, when the user selects the Printer Selection bar 705.

While the GUI labeled "Select Printer" and designating "Printer B" as the selected printing device is presented on the display of the mobile computing device 200, the mobile computing device 200 may receive an input designating "Printer C" as the selected printing device. In response to the input, the mobile computing device 200 may present the example GUI 710 of FIG. 7B on the display of the mobile computing device 200. Thus, the radio button associated with "Printer C" is presented as the designated radio button 714, as shown in FIG. 7B.

While the example GUI 710 of FIG. 7B is presented on the display of the mobile computing device 200, the mobile computing device 200 may receive an input indicating that a user has selected the Return to Print button 711. In response to the input, the mobile computing device 200 may present the example GUI 720 of FIG. 7C on the display of the mobile computing device 200. The example GUI 720 of FIG. 7C includes the Print button. The Print button of FIG. 7C is an interface element enabling a user to submit a print request by selecting the Print button presented on the display of the mobile computing device 200. In some embodiments, selection of the Print button of FIG. 7C will issue an instruction for the mobile computing device 200 to send the file having "Example.pdf" as a file name to the printer having "Printer C" as a printer name.

In some embodiments, the printer name "Printer A" in the example GUI 710 represents the printing device 100A of FIG. 4; and information associated with the printing device 100A, such as the IP address of the printing device 100A, is stored on the mobile computing device 200. In some embodiments, the printer name "Printer B" in the example GUI 700 and the example GUI 710 represents the printing device 100B of FIG. 4; and information associated with the printing device 100B, such as the IP address of the printing device 100B, is stored on the mobile computing device 200. In some embodiments, the printer name "Printer C" in the example GUI 710 and the example GUI 720 represents the printing device 100C of FIG. 4; and information associated with the printing device 100C, such as the IP address of the printing device 100C, is stored on the mobile computing device 200.

By way of example, the mobile computing device 200 may receive an input indicating that a user has selected the Print button presented in the example GUI 720 of FIG. 7C. Further by way of example, the printer name "Printer C" may identify the printing device 100C of FIG. 4. Thus, as indicated by the Printer Selection bar 721 of FIG. 7C, the printing device 100C is the selected printing device in connection with the print request received at the mobile computing device 200 based on the user's selection of the Print button in the example GUI 720.

Referring to FIGS. 6 and 7C, the print request based on a selection of the Print button of FIG. 7C is an example of a received print request described with reference to step S601. In response to the print request based on selection of the Print button of FIG. 7C, the mobile computing device 200 may perform one or more operations described with reference to step S602. For example, in response to the print request, the mobile computing device 200 may send to the printing device 100C a print job that includes: (1) the file having "Example.pdf" as a file name; and (2) a print job identifier that identifies the print job. In some embodiments, the print job may also include print setting information pertaining to the print job.

If the printing device 100C receives and acknowledges receipt of the print job, the mobile computing device 200 may generate and store a record associated with the print job, as described with reference to steps S605 and S606. For example, the mobile computing device 200 may generate a record that includes: (1) information for locating the printing device 100C; and (2) the print job identifier. The information for locating the printing device 100C may be an IP address or hostname of the printing device 100C, for example. In some embodiments, the record may include other information associated with the print job such as a username, file name "Example.pdf" or time stamp.

Figure 8:
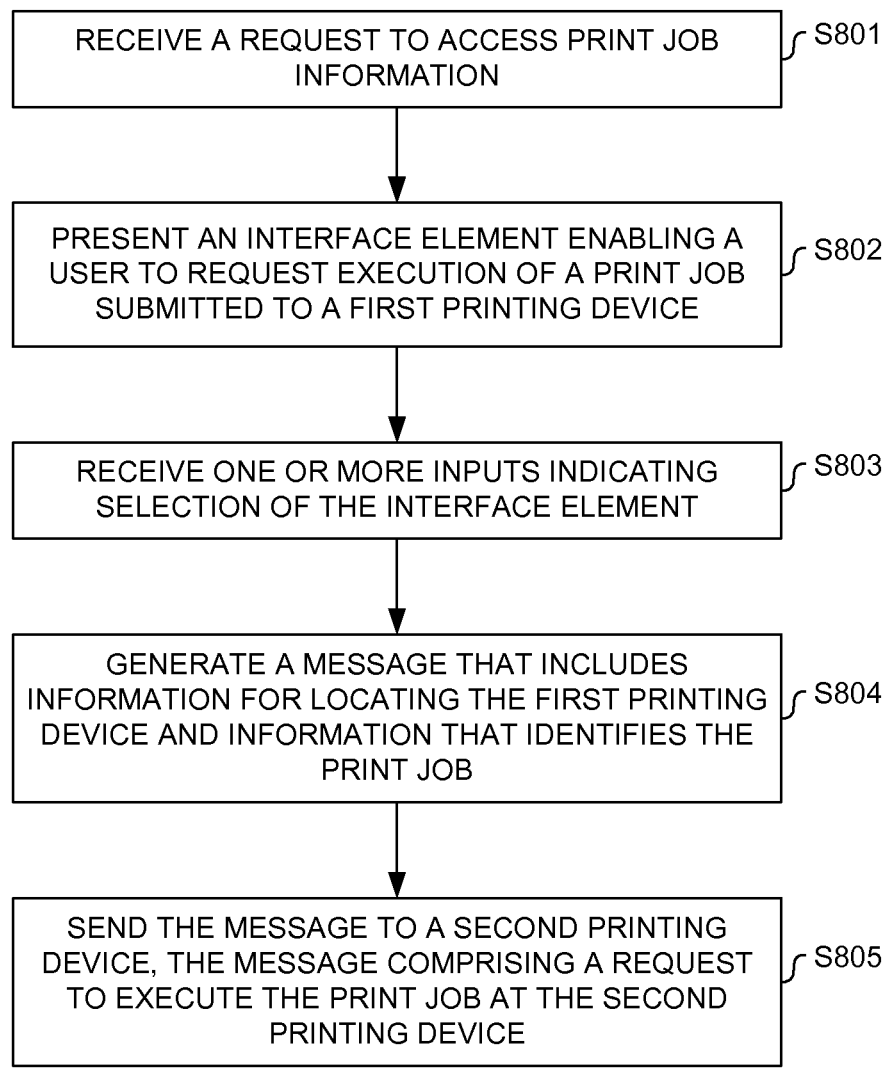
FIG. 8 illustrates an example flow of operations at a mobile computing device.

FIG. 8 is described with reference to the example network environment 400 of FIG. 4. FIG. 8 illustrates an example flow of operations at the mobile computing device 200. One or more of the steps of FIG. 8 may be performed based on or in accordance with default settings for the application 402, a predetermined policy, one or more inputs indicating one or more user selections, or a combination of two or more of these.

In step S801, the mobile computing device 200 receives a request to access print job information. For example, the record stored in step S606 may be one of multiple records in the data store. Each record in the data store may be representative of a separate print job sent by the mobile computing device 200, and each record may include print job information associated with a respective print job. In some embodiments, the records in the data store may be represented in a GUI on the display of the mobile computing device 200. In some embodiments, step S801 includes receiving a request to access the print job information based on one or more user inputs for navigating to a GUI in which one or more interface elements representing one or more record(s) is/are presented on the display of the mobile computing device 200.

In step S802, the mobile computing device 200 presents an interface element enabling a user to request execution of a print job submitted to a printing device based on selection of the interface element. For example, in response to the one or more inputs received in step S801, the application 402 executing on the mobile computing device 200 may present a GUI including one or more graphical elements representing separate records. In some embodiments, each record represents a print job which has been sent to a printing device. In some embodiments, each record represents a print job which has been sent to a printing device and which has not been released. In some embodiments, each of the one or more graphical elements representing a record in the GUI is an interface element enabling a user to request execution of a respective print job based on selection of the interface element corresponding to the respective print job.

In step S803, the mobile computing device 200 receives one or more inputs indicating selection of an interface element presented in step S802. The one or more inputs may be provided to the mobile computing device 200 in any suitable manner. For example, the one or more inputs may be provided by a user via the I/O interface 204 of the mobile computing device 200. In some embodiments, selecting the interface element is based on one or more inputs received via a hard key of the mobile computing device 200. In some embodiments, selecting the interface element is based on one or more inputs received via a touch screen of the mobile computing device 200.

In some embodiments, selection of an interface element in step S803 will issue an instruction for the mobile computing device 200 to request execution of a print job. In some embodiments, an interface element corresponding to a print job may be selected based on an input to a single interface element, where the single interface element is the selected interface element corresponding to the print job. In some embodiments, an interface element corresponding to a print job may be selected based on inputs to multiple interface elements. For example, the interface element corresponding to the print job may be presented as a designated interface element based on an input to the interface element corresponding to the print job; then, the interface element corresponding to the print job may be selected based on an input to another interface element (such as a Release button, an Enter button, an Execute Print button, or other suitable interface element) while the interface element corresponding to the print job is presented as a designated interface element. In some embodiments, based on the selection of an interface element corresponding to a print job, the mobile computing device 200 requests execution of the print job corresponding to the selected interface element. For example, the mobile computing device 200 may request execution of the print job corresponding to the selected interface element by performing operations described with reference to step S804 and step S805, the operations being performed with respect to the print job corresponding to the selected interface element.

In step S804, the mobile computing device 200 generates a message that includes information for locating the printing device to which the print job corresponding to the selected interface element was submitted, and information that identifies the print job. For example, the mobile computing device 200 generates a message that includes information for locating the printing device to which the print job was sent in step S602, and the information that identifies the print job sent in step S602. The mobile computing device 200 may retrieve information from the record represented by the interface element selected in step S803. For example, the mobile computing device 200 may retrieve the information for locating the printing device which was included in the record generated in step S605, and retrieve the information that identifies the print job which was included in the record generated in step S605.

In step S805, the mobile computing device 200 sends the message generated in step S804 to a printing device. In some embodiments, the printing device to which the message is sent in step S805 is different from the printing device to which the print job was submitted. For example, a print job may be sent to a first printing device as described with reference to step S602. Then, in some embodiments, in step S805 the mobile computing device 200 sends, to a second printing device different from the first printing device to which the print job was submitted, a message that includes information for locating the first printing device and information that identifies the print job sent in step S602. In some embodiments, the message sent in step S805 comprises a request to execute the print job at the second printing device. For example, the message sent in step S805 may comprise a request to execute, at the second printing device, the print job which was sent to the first printing device in step S602. In some embodiments, the message sent in step S805 further includes a request that the print job be deleted from the printing device to which the print job was submitted. For example, step S805 may include sending, from the mobile computing device 200 to the second printing device different from the first printing device to which the print job was sent in step S602, a message that includes the information for locating the first printing device, the information that identifies the print job sent in step S602, and a request that the print job be deleted from the first printing device.

In some embodiments, the printing device to which the message is sent in step S805 is a printing device registered on the mobile computing device 200. For example, during a registration process such as described with reference to FIG. 5, the mobile computing device 200 may have obtained information associated with a printing device, the information associated with the printing device being usable by the mobile computing device 200 to establish a communication session between the mobile computing device 200 and the printing device. The mobile computing device 200 may have stored the information associated with the printing device in a data structure such that the information is associated with the printing device in the data structure. For example, an IP address of a registered printing device may be associated with the registered printing device in the data structure. In some embodiments, step S805 includes using the information associated with the printing device to send the message in step S805. For example, in step S805, the mobile computing device 200 may send the message generated in step S804 to a registered printing device using information which was stored during the registration process and which is associated with the registered printing device.

Figure 9:
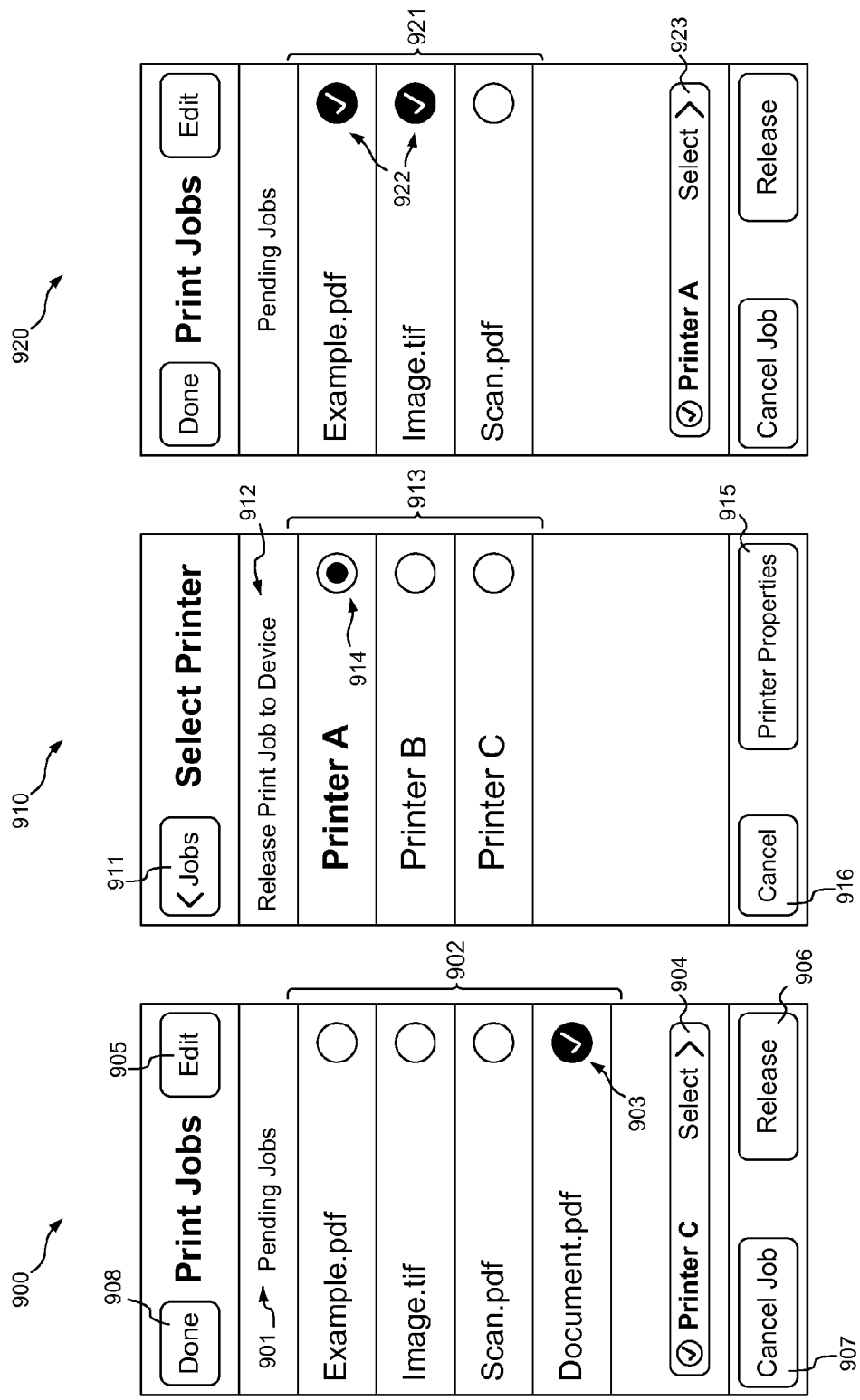
FIG. 9A illustrates an example graphical user interface on a display of a mobile computing device.
FIG. 9B illustrates an example graphical user interface on a display of a mobile computing device.
FIG. 9C illustrates an example graphical user interface on a display of a mobile computing device.

FIG. 9A illustrates an example GUI 900 on the display of the mobile computing device 200. The example GUI 900 includes interface elements enabling a user to release one or more print jobs. In some embodiments, the application 402 executing on the mobile computing device 200 presents the example GUI 900 on the display of the mobile computing device 200. By way of example and not by way of limitation, the example GUI 900 may be presented in response to one or more user inputs indicating selection of an interface element and/or when one or more predefined criteria are met. In some embodiments, the example GUI 900 is presented in response to the one or more user inputs received in step S801. The example GUI 900 includes Pending Print Job information 901, a list of pending print jobs 902, indicator buttons each associated with a respective pending print job, the indicator buttons including a designated indicator button 903, a Printer Selection bar 904, an Edit button 905, a Release button 906, a Cancel Job button 907, and a Done button 908.

The Pending Print Job information 901 includes textual information that identifies the current screen presented on the display. The text indicates a category of items ("Pending Jobs") presented on the display. The list of pending print jobs 902 includes respective graphical elements having textual information identifying a name associated with each pending print job included in the list of pending print jobs 902. In some embodiments, each name associated with a respective pending print job in the list of pending print jobs 902 is a file name of a file included as print data in the respective pending print job. Each graphical element may correspond to a respective pending print job, and may represent a respective record stored on the mobile computing device 200. Each indicator button is an interface element associated with a respective pending print job. By selecting the indicator button associated with a pending print job, a user may designate the pending print job corresponding to the designated indicator button 903 as a selected pending print job. For example, in response to a user input indicating selection of the indicator button associated with the pending print job labeled "Document.pdf," the mobile computing device 200 may present the designated indicator button 903, as shown in FIG. 9A. The designated indicator button 903 includes a check mark over a filled-in circle to present the indicator button associated with the pending print job labeled "Document.pdf" as a designated interface element.

The Printer Selection bar 904 enables a user to select a printing device for executing a printing operation based on a print job once the print job is released. The Printer Selection bar 904 includes textual information that identifies the printing device currently designated as the selected printing device. The text indicates the printing device having printer name "Printer C" is the selected printing device. In some embodiments, the Printer Selection bar 904 provides functionality to modify an existing setting by removing a printing device as the designated printer for executing a printing operation once a print job is released, and selecting an alternative printing device to print the released print job. In response to a user selecting the Printer Selection bar 904, the mobile computing device 200 may present one or more interface elements each representing a respective printing device available to be selected by the user for printing the released print job. In some embodiments, in response to selection of the Printer Selection bar 904 (or the Printer Selection bar 923, described below with reference to FIG. 9C), a screen such as shown at FIG. 9B for selecting a printer is presented on the display of the mobile computing device 200.

The Edit button 905 provides functionality for modifying aspects of a pending print job. For example, one or more aspects of a pending print job designated as a selected pending print job may be modified by a user upon selection of the Edit button 905. As indicated by the designated indicator button 903 shown in FIG. 9A, the pending print job labeled "Document.pdf" is a selected pending print job. Accordingly, in response to selection of the Edit button 905 while the pending print job "Document.pdf" is designated as the selected pending print job, the mobile computing device 200 may present one or more interface elements enabling a user to modify one or more aspects of the pending print job labeled "Document.pdf." Examples of modifications include the following: modifying print setting information by adding, deleting, or changing one or more print settings to apply when the print job is executed (e.g., print settings may need to be modified in accordance with the capabilities of the printing device selected to execute the printing operation); adding, removing, or changing one or more instructions or requests (e.g., regarding deletion of a print job once released, use of an authentication mechanism, or other suitable instruction or request); adding or deleting one or more files to be printed; adding, removing or changing other information associated with the print job (e.g., information in a record on the mobile computing device 200, registration information associated with a registered printing device, or other suitable information); a combination of two or more of these, or other suitable modification to an aspect of the selected pending print job. The mobile computing device 200 may implement these modifications by updating information stored on the mobile computing device 200, by transmitting information to the printing device selected for executing the printing operation once the print job is released, by transmitting information to the printing device to which the print job was sent in step S602, by transmitting information to another computing system, or a combination of two or more of these.

The Release button 906 provides functionality to request execution of a print job. For example, one or more pending print jobs designated as selected pending print job(s) may be released and printed based on selection of the Release button

906. As indicated by the designated indicator button 903 shown in FIG. 9A, the pending print job labeled "Document.pdf" is a selected pending print job. Accordingly, in response to selection of the Release button 906 while the pending print job "Document.pdf" is designated as the selected pending print job, the mobile computing device 200 may initiate processing to send a message to a specified printing device, the message comprising a request to execute the pending print job labeled "Document.pdf" at the specified printing device. In some embodiments, the message includes information for locating the printing device to which the print job was sent in step S602, and information that identifies the print job sent in step S602.

The Cancel Job button 907 provides functionality to cancel a pending print job designated as a selected pending print job. As indicated by the designated indicator button 903, the pending print job labeled "Document.pdf" is the selected pending print job in FIG. 9A. In response to selection of the Cancel Job button 907 while the pending print job labeled "Document.pdf" is designated as the selected pending print job, the mobile computing device 200 initiates one or more operations with respect to the pending print job labeled "Document.pdf."

In some embodiments, in response to selection of the Cancel Job button 907, the record represented by the graphical element identifying the name "Document.pdf" is deleted from the mobile computing device 200. The record may have been generated in the manner described with reference to step S605, and stored on the mobile computing device 200 in the manner described with reference to step S606. For example, a record and information items included in the record may be associated with the pending print job labeled "Document.pdf" and, in response to selection of the Cancel Job button 907 while the pending print job labeled "Document.pdf" is designated as a selected pending print job, the record and the information items in the record are deleted.

In some embodiments, in response to selection of the Cancel Job button 907, the graphical element identifying the name "Document.pdf" is removed from the list of pending print jobs 902. Accordingly, the respective graphical elements identifying the names "Example.pdf," "Image.tif," and "Scan.pdf" may continue to be presented on the display of the mobile computing device 200, while the graphical element identifying the name "Document.pdf" is not presented on the display of the mobile computing device 200. By way of example, a list of pending print jobs such as the list of pending print jobs 902 shown in FIG. 9A, for example, may be presented on the display of the mobile computing device 200 and, in response to selection of the Cancel Job button 907 while the pending print job "Document.pdf" is designated as the selected pending print job, an updated list of pending print jobs such as the list of pending print jobs 921 shown in FIG. 9C, for example, may be presented on the display of the mobile computing device 200.

In some embodiments, in response to selection of the Cancel Job button 907, the pending print job labeled "Document.pdf" is deleted from the printing device on which the print job is stored. The printing device storing the pending print job labeled "Document.pdf" may be the printing device to which the print job was sent in step S602. By way of example, the mobile computing device 200 may store information for locating the printing device on which the pending print job labeled "Document.pdf" is stored and, in response to selection of the Cancel Job button 907 while the pending print job labeled "Document.pdf" is designated as a selected pending print job, the mobile computing device 200 may use the information for locating the printing device to send, to the printing device, a request to delete the pending print job labeled "Document.pdf" from the printing device. The request may be a message that includes other information associated with the pending print job labeled "Document.pdf," such as the information that identifies the print job (e.g., the print job identifier).

The Done button 908 provides functionality to exit the "Pending Jobs" screen without modifying the list of pending print jobs 902. For example, selecting the Done button 908 may enable a user to exit the "Pending Jobs" screen without releasing or canceling a pending print job included in the list of pending print jobs 902. In some embodiments, modifications of existing settings are saved or maintained when the Done button 908 is used to exit the "Pending Jobs" screen. For example, changing which printing device is designated as the selected printing device in the Printer Selection bar 904, modifying one or more aspects of a selected pending print job via the Edit button 905, changing which pending print job(s) in the list of pending print jobs 902 is/are designated as selected pending print job(s), a combination of two or more of these, or other suitable modifications, may be maintained when the Done button 908 is used to exit the "Pending Jobs" screen, according to some embodiments.

FIG. 9B illustrates an example GUI 910 on the display of the mobile computing device 200. The example GUI 910 includes interface elements enabling a user to select a printing device for executing a printing operation based on a print job once the print job is released. In some embodiments, the application 402 executing on the mobile computing device 200 presents the example GUI 910 on the display of the mobile computing device 200. By way of example and not by way of limitation, the example GUI 910 may be presented in response to one or more user inputs indicating selection of an interface element and/or when one or more predefined criteria are met. In some embodiments, a screen such as shown at FIG. 9B for selecting a printer is presented in response to selection of the Printer Selection bar 904 (or the Printer Selection bar 923, described below with reference to FIG. 9C). The example GUI 910 includes a Return to Pending Print Jobs button 911, Printing Device information 912, a list of printers 913, radio buttons each associated with a respective printer, the radio buttons including a designated radio button 914, a Printer Properties button 915, and a Cancel button 916.

The Return to Pending Print Jobs button 911 provides functionality to return to a "Pending Jobs" screen. In some embodiments, in response to selection of the Return to Pending Print Jobs button 911, a screen such as shown at FIG. 9A (or such as shown at FIG. 9C, described below) is presented on the display of the mobile computing device 200. In some embodiments, a user input indicating selection of the Return to Pending Print Jobs button 911 may cause the "Select Printer" screen presented in the example GUI 910 to close. In some embodiments, a modification of an existing setting by removing a printing device as the designated printer for a released print job, and selecting an alternative printing device for the released print job is saved and maintained when the Return to Pending Print Jobs button 911 is used to exit the "Select Printer" screen. The Printing Device information 912 includes textual information that identifies the current screen presented on the display of the mobile computing device 200. The text indicates that the selected printing device is to be used to print a released print job ("Release Print Job to Device").

The list of printers 913 includes respective graphical elements having textual information identifying a printer name ("Printer A" and "Printer B" and "Printer C") for each printing device represented in the list of printers 913. Each graphical element represents a respective printing device registered on the mobile computing device 200. Each radio button is an interface element associated with a respective printer. By selecting the radio button associated with a printer, a user may designate the printer corresponding to the designated radio button 914 as a selected printer. For example, in response to a user input indicating selection of the radio button associated with the printer having "Printer A" as a printer name, the mobile computing device 200 may present the designated radio button 914, as shown in FIG. 9B. The designated radio button 914 may include a dot or other mark to present the radio button associated with the printer labeled "Printer A" as a designated interface element. Accordingly, in response to selection of the Printer Properties button 915 while "Printer A" is designated as the selected printer, information about the printer identified as "Printer A" would be presented on the display of the mobile computing device 200. For example, the mobile computing device 200 may present a screen or a window having any suitable information associated with the printer such as identification information, location information, information indicating capabilities of the printer (e.g., color printing, duplex printing), available finishing options (e.g., stapling), or other suitable information associated with the printer.

The Cancel button 916 provides functionality to exit the "Select Printer" screen without modifying settings associated with the Printer. Accordingly, in some embodiments, a modification of an existing setting by removing a printing device as the designated printer for a released print job, and selecting an alternative printing device for the released print job, may not be saved or maintained when the Cancel button 916 is used to exit the "Select Printer" screen. In some embodiments, such information is maintained when the Cancel button 916 is used.

FIG. 9C illustrates an example GUI 920 on the display of the mobile computing device 200. In some embodiments, the application 402 executing on the mobile computing device 200 presents the example GUI 920 on the display of the mobile computing device 200. The example GUI 920 of FIG. 9C includes interface elements and features similar to those of the example GUI 900 of FIG. 9A, except for the following differences: the list of pending print jobs 902 of FIG. 9A includes respective graphical elements identifying the names "Example.pdf," "Image.tif," "Scan.pdf," and "Document.pdf," while the list of pending print jobs 921 of FIG. 9C includes respective graphical elements identifying the names "Example.pdf," "Image.tif," and "Scan.pdf" but does not include a graphical element identifying the name "Document.pdf." Furthermore, the designated indicator button 903 of FIG. 9A designates the pending print job labeled "Document.pdf" as a selected pending print job, while the two designated indicator buttons 922 of FIG. 9C designate the pending print jobs labeled "Example.pdf" and "Image.tif," respectively, as selected pending print jobs. Furthermore, the Printer Selection bar 904 of FIG. 9A indicates "Printer C" is a selected printing device, while the Printer Selection bar 923 of FIG. 9C indicates "Printer A" is the selected printing device.

According to some embodiments, FIGS. 9A, 9B and 9C show example GUIs presented in response to various user inputs. In some embodiments, the printer name "Printer A" in the example GUI 910 and the example GUI 920 represents the printing device 100A of FIG. 4; and information associated with the printing device 100A, such as the IP address of the printing device 100A, is stored on the mobile computing device 200. In some embodiments, the printer name "Printer B" in the example GUI 910 represents the printing device 100B of FIG. 4; and information associated with the printing device 100B, such as the IP address of the printing device 100B, is stored on the mobile computing device 200. In some embodiments, the printer name "Printer C" in the example GUI 900 and the example GUI 910 represents the printing device 100C of FIG. 4; and information associated with the printing device 100C, such as the IP address of the printing device 100C, is stored on the mobile computing device 200.

Referring to FIGS. 8 and 9A-9C, in some embodiments, the example GUI 900 is presented in response to receiving one or more user inputs such as described with reference to step S801. For example, the mobile computing device 200 may receive a request to access the "Pending Jobs" screen based on one or more inputs. In response to the request, the mobile computing device 200 may perform one or more operations described with reference to step S802. By way of example, the mobile computing device 200 may present the example GUI 900 of FIG. 9A on the display of the mobile computing device 200. While the example GUI 900 of FIG. 9A is presented on the display of the mobile computing device 200, the mobile computing device 200 may receive one or more inputs such as described with reference to step S803. In some embodiments, the mobile computing device 200 receives an input indicating that a user has selected the Release button 906 presented in the example GUI 900 of FIG. 9A.

By way of example, the printer name "Printer C" may identify the printing device 100C of FIG. 4. Thus, as indicated by the Printer Selection bar 904 of FIG. 9A, the printing device 100C is the selected printing device in connection with the request received at the mobile computing device 200 based on the user's selection of the Release button 906 of FIG. 9A. Moreover, as indicated by the designated indicator button 903 shown in FIG. 9A, the pending print job labeled "Document.pdf" is a selected pending print job.

Accordingly, in response to selection of the Release button 906 while the pending print job "Document.pdf" is designated as the selected pending print job and the printing device 100C is designated as the selected printing device, the mobile computing device 200 may perform one or more operations such as described with reference to step S804 and step S805. For example, the mobile computing device 200 may generate a message that includes: (1) information for locating the printing device storing the pending print job labeled "Document.pdf," and (2) information that identifies the pending print job labeled "Document.pdf." The information that identifies the pending print job labeled "Document.pdf" may be a print job identifier. In some embodiments, the message is generated using information stored on the mobile computing device in a record. In some embodiments, the mobile computing device 200 generates the message in the manner described with reference to step S804.

Once the message is generated, the mobile computing device 200 may send the generated message to the printing device 100C, the message comprising a request to execute the print job labeled "Document.pdf" at the printing device 100C. By way of example, the printing device storing the pending print job labeled "Document.pdf" may be the printing device 100A having the printer name "Printer A." For example, the mobile computing device 200 may have sent the print job labeled "Document.pdf" to the printing device 100A in the manner described with reference to step S602.

Accordingly, in response to selection of the Release button 906 shown in FIG. 9A, the mobile computing device 200 may send to the printing device 100C a message that includes: (1) information for locating the printing device 100A; and (2) information that identifies the print job (e.g., a print job identifier). The information for locating the printing device 100A may be an IP address or hostname of the printing device 100A. In some embodiments, the mobile computing device 200 sends the message to the printing device 100C in the manner described with reference to step S805.

In some embodiments, once the mobile computing device 200 sends the message to the printing device 100C, the application executing on the mobile computing device 200 may delete all or a portion of the information associated with the pending print job labeled "Document.pdf" from the mobile computing device 200. For example, the application executing on the mobile computing device 200 may delete a record represented by the graphical element identifying the name "Document.pdf." In some embodiments, the application executing on the mobile computing device 200 deletes the graphical element identifying the name "Document.pdf" from the list of pending print jobs 902.

According to some embodiments, while the example GUI 900 of FIG. 9A is presented on the display of the mobile computing device 200, the mobile computing device 200 may receive one or more inputs indicating selection of the Cancel Job button 907. Accordingly, the mobile computing device 200 may perform one or more operations to cancel the designated pending print job labeled "Document.pdf." In some embodiments, canceling the pending print job labeled "Document.pdf" includes deleting all or a portion of the information associated with the pending print job labeled "Document.pdf" from the mobile computing device 200. For example, the application executing on the mobile computing device 200 may delete a record represented by the graphical element identifying the name "Document.pdf." In some embodiments, the application executing on the mobile computing device 200 deletes the graphical element identifying the name "Document.pdf" from the list of pending print jobs 902.

According to some embodiments, the mobile computing device 200 receives an input indicating that a user has selected the Printer Selection bar 904. In some embodiments, before the mobile computing device 200 receives the input indicating selection of the Printer Selection bar 904, the graphical element identifying the name "Document.pdf" was removed from the list of pending print jobs 902 (e.g., because the print job labeled "Document.pdf" was released or canceled). In response to the selection of the Printer Selection bar 904, the mobile computing device 200 may present a GUI labeled "Select Printer" such as the example GUI 910 but with "Printer C" designated as the selected printing device. For example, the mobile computing device 200 may present a GUI that includes interface elements and features similar to those of the example GUI 910 of FIG. 9B, except that a designated radio button would be associated with "Printer C" instead of "Printer A." This is because "Printer C" is designated as selected printing device, as shown in FIG. 9A, when the user selects the Printer Selection bar 904.

While the GUI labeled "Select Printer" and designating "Printer C" as the selected printing device is presented on the display of the mobile computing device 200, the mobile computing device 200 may receive an input designating "Printer A" as the selected printing device. In response to the input, the mobile computing device 200 may present the example GUI 910 of FIG. 9B on the display of the mobile computing device 200. Thus, the radio button associated with "Printer A" is presented as the designated radio button 914, as shown in FIG. 9B.

While the example GUI 910 of FIG. 9B is presented on the display of the mobile computing device 200, the mobile computing device 200 may receive an input indicating that a user has selected the Return to Pending Print Jobs button 911. In response to the input, the mobile computing device 200 may present a GUI that includes interface elements and features similar to those of the example GUI 920 of FIG. 9C, except that none of the indicator buttons is presented as a designated indicator button because the respective indicator buttons have not yet been selected. While the GUI is presented on the display of the mobile computing device 200, the mobile computing device 200 may receive an input to the indicator button associated with the pending print job labeled "Example.pdf" and an input to the indicator button associated with the pending print job labeled "Image.tif." Accordingly, the two designated indicator buttons 922 of FIG. 9C are presented on the display to designate the pending print jobs labeled "Example.pdf" and "Image.tif," respectively, as selected pending print jobs, as shown in FIG. 9C.

While the example GUI 920 of FIG. 9C is presented on the display of the mobile computing device 200, the mobile computing device 200 may receive one or more inputs such as described with reference to step S803. In some embodiments, the mobile computing device 200 receives an input indicating that a user has selected the Release button presented in the example GUI 920 of FIG. 9C.

By way of example, the printer name "Printer A" may identify the printing device 100A of FIG. 4. Thus, as indicated by the Printer Selection bar 923 of FIG. 9C, the printing device 100A is the selected printing device in connection with the request received at the mobile computing device 200 based on the user's selection of the Release button of FIG. 9C. Moreover, as indicated by the designated indicator buttons 922 in FIG. 9C, the pending print jobs labeled "Example.pdf" and "Image.tif" are selected pending print jobs.

Accordingly, in response to selection of the Release button of FIG. 9C while the pending print jobs "Example.pdf" and "Image.tif" are designated as selected pending print jobs and the printing device 100A is designated as the selected printing device, the mobile computing device 200 may perform one or more operations such as described with reference to step S804 and step S805. For example, the mobile computing device 200 may generate a message that includes: information for locating the printing device(s) storing the pending print jobs labeled "Example.pdf" and "Image.tif;" information that identifies the pending print job labeled "Example.pdf;" and information that identifies the pending print job labeled "Image.tif." The information that identifies the pending print job labeled "Example.pdf" may be a first print job identifier, and the information that identifies the pending print job labeled "Image.tif" may be a second print job identifier different from the first print job identifier. In some embodiments, the message is generated using respective information stored on the mobile computing device in each of a record associated with the print job labeled "Example.pdf" and a record associated with the print job labeled "Image.tif." In some embodiments, the mobile computing device 200 generates the message in the manner described with reference to step S804.

Once the message is generated, the mobile computing device 200 may send the generated message to the printing device 100A, the message comprising a request to execute the print job labeled "Example.pdf" and the print job labeled "Image.tif" at the printing device 100A. By way of example, the printing device storing the pending print job labeled "Example.pdf" may be the printing device 100C having the printer name "Printer C." For example, the mobile computing device 200 may have sent the print job labeled "Example.pdf" to the printing device 100C in the manner described with reference to step S602. Further by way of example, the printing device storing the pending print job labeled "Image.tif" may be the printing device 100B having the printer name "Printer B." For example, the mobile computing device 200 may have sent the print job labeled "Image.tif" to the printing device 100B in the manner described with reference to step S602. Accordingly, in response to selection of the Release button shown in FIG. 9C, the mobile computing device 200 may send to the printing device 100A a message that includes: (1) information for locating the printing device 100C; (2) information that identifies the print job labeled "Example.pdf" (e.g., a first print job identifier); (3) information for locating the printing device 100B; and (4) information that identifies the print job labeled "Image.tif" (e.g., a second print job identifier). The information for locating the printing device 100C may be an IP address or hostname of the printing device 100C, and the information for locating the printing device 100B may be an IP address or hostname of the printing device 100B. In some embodiments, the mobile computing device 200 sends the message to the printing device 100A in the manner described with reference to step S805.

Further by way of example, the printing device storing the pending print job labeled "Example.pdf" may be the printing device 100C having the printer name "Printer C." For example, the mobile computing device 200 may have sent the print job labeled "Example.pdf" to the printing device 100C in the manner described with reference to step S602. Moreover, the printing device storing the pending print job labeled "Image.tif" may be the printing device 100A having the printer name "Printer A." For example, the mobile computing device 200 may have sent the print job labeled "Image.tif" to the printing device 100A in the manner described with reference to step S602. Accordingly, in response to selection of the Release button shown in FIG. 9C, the mobile computing device 200 may send to the printing device 100A a message that includes: (1) information for locating the printing device 100C; (2) information that identifies the print job labeled "Example.pdf" (e.g., a first print job identifier); and (3) information that identifies the print job labeled "Image.tif" (e.g., a second print job identifier). The information for locating the printing device 100C may be an IP address or hostname of the printing device 100C. In some embodiments, the message sent to the printing device 100A may further include information associated with the printing device 100A, such as an IP address or hostname of the printing device 100A. In some embodiments, the mobile computing device 200 sends the message to the printing device 100A in the manner described with reference to step S805.

In some embodiments, once the mobile computing device 200 sends the message to the printing device 100A, the application executing on the mobile computing device 200 may delete all or a portion of the information associated with the pending print job labeled "Example.pdf" and/or all or a portion of the information associated with the pending print job labeled "Image.tif" from the mobile computing device 200. For example, the application executing on the mobile computing device 200 may delete a record represented by the graphical element identifying the name "Example.pdf" and/or a record represented by the graphical element identifying the name "Image.tif." In some embodiments, the application executing on the mobile computing device 200 deletes the graphical element identifying the name "Example.pdf" and/or the graphical element identifying the name "Image.tif" from the list of pending print jobs 921.

Figure 10:
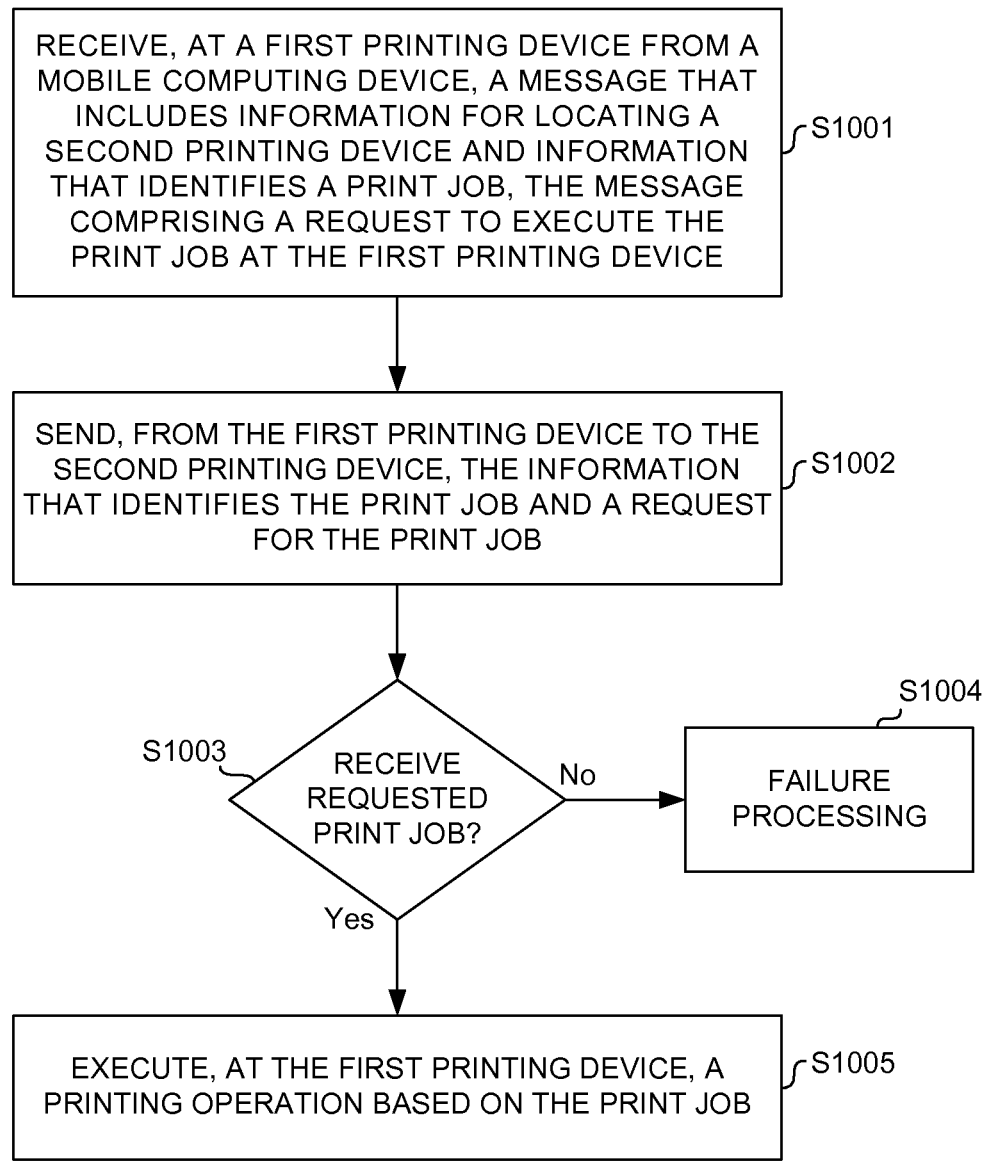
FIG. 10 illustrates an example flow of operations at a printing device.

FIG. 10 is described with reference to the example network environment 400 of FIG. 4. FIG. 10 illustrates an example flow of operations at a printing device (e.g., the printing device 100A, the printing device 100B, or the printing device 100C). One or more of the steps of FIG. 10 may be performed based on or in accordance with default settings for an application (e.g., the application 401A, the application 401B, or the application 401C) on the printing device, a predetermined policy, one or more inputs indicating one or more user selections, or a combination of two or more of these.

In step S1001, a first printing device receives a message from the mobile computing device 200, the message including information for locating a second printing device and information that identifies a print job. The message may be a request to execute the print job at the first printing device. In some embodiments, step S1001 includes receiving, at the first printing device from the mobile computing device 200, the message the mobile computing device 200 sent in step S805.

For example, in step S1001, the printing device 100A may receive from the mobile computing device 200 a message that includes: (1) information for locating the printing device 100C; and (2) a print job identifier. In some embodiments, the mobile computing device 200 performed one or more operations described with reference to FIG. 6 and/or FIG. 8. For example, the mobile computing device 200 may have sent a print job to the printing device 100C in the manner described with reference to step S602; the mobile computing device 200 may have generated the message including the information for locating the printing device 100C and the print job identifier in the manner described with reference to step S804; and the mobile computing device 200 may have sent the message to the printing device 100A in the manner described with reference to step S805.

In step S1002, the first printing device sends to the second printing device a request for the print job. In some embodiments, in response to receiving the message in step S1001, the first printing device may use information included in the message received in step S1001 to send the request for the print job to the second printing device. For example, the first printing device may use the information for locating the second printing device to establish a communication session between the first printing device and the second printing device for requesting the print job. In some embodiments, step S1002 includes sending, from the first printing device to the second printing device, a request that includes the information that identifies the print job received in step S1001. By way of example, the first printing device may send to the second printing device the print job identifier and a request for the print job having an identifier that matches the print job identifier.

For example, in step S1002, the printing device 100A may send to the printing device 100C the print job identifier received in step S1001, and a request for the print job having an identifier that matches the print job identifier. In some embodiments, the request is a request for printing device 100C to send to the printing device 100A the print job which the mobile computing device 200 sent to the printing device 100C in step S602.

In step S1003, it is determined whether the print job requested in step S1002 has been received at the first printing device. For example, the application 401A executing on the printing device 100A may determine whether the print job requested in step S1002 has been received at the printing device 100A. In some embodiments, step S1003 includes receiving the print job requested in step S1002. For example, the printing device 100A may receive from the printing device 100C the print job having an identifier that matches the print job identifier that was received in step S1001 and that was sent in step S1002. In some embodiments, step S1003 includes receiving, at the printing device 100A from the printing device 100C, the print job which the mobile computing device 200 sent to the printing device 100C in step S602. Based on receipt of the print job having an identifier that matches the print job identifier sent in step S1002, it is determined that the print job requested in step S1002 has been received at the first printing device. On the other hand, if the printing device 100A does not receive a print job having an identifier that matches the print job identifier sent in step S1002, it is determined that the print job requested in step S1002 has not been received at the first printing device.

In step S1003, in response to determining that the print job requested in step S1002 has not been received at the first printing device (No in step S1003), the process advances to step S1004. In step S1004, failure processing is performed in response to the determination that the requested print job was not received at the first printing device. For example, a message may be sent to the mobile computing device 200 and presented on the display of the mobile computing device 200 indicating, for example, that the print job selected to be released has not been received at the first printing device. In some embodiments, the message may be presented on the display of the first printing device. On the other hand, in response to determining that the print job requested in step S1002 has been received at the first printing device (Yes in step S1003), the process advances to step S1005.

In step S1005, a printing operation based on the print job received in step S1003 is executed at the first printing device. In some embodiments, step S1005 includes executing a printing operation based on the print job sent in step S602. For example, in step S1005, the printing device 100A may execute a printing operation based on a print job which the mobile computing device 200 sent to the printing device 100C in step S602, and which the printing device 100A received from the printing device 100C in step S1003. In some embodiments, step S1005 includes performing printing according to print data included in the print job received in step S1003. For example, the print data may be processed at the printing device 100A to generate printed text or images on one or more sheets of paper according to the print data. In some embodiments, step S1005 includes performing printing in accordance with print setting information included in the print job received in step S1003.

Figure 11:
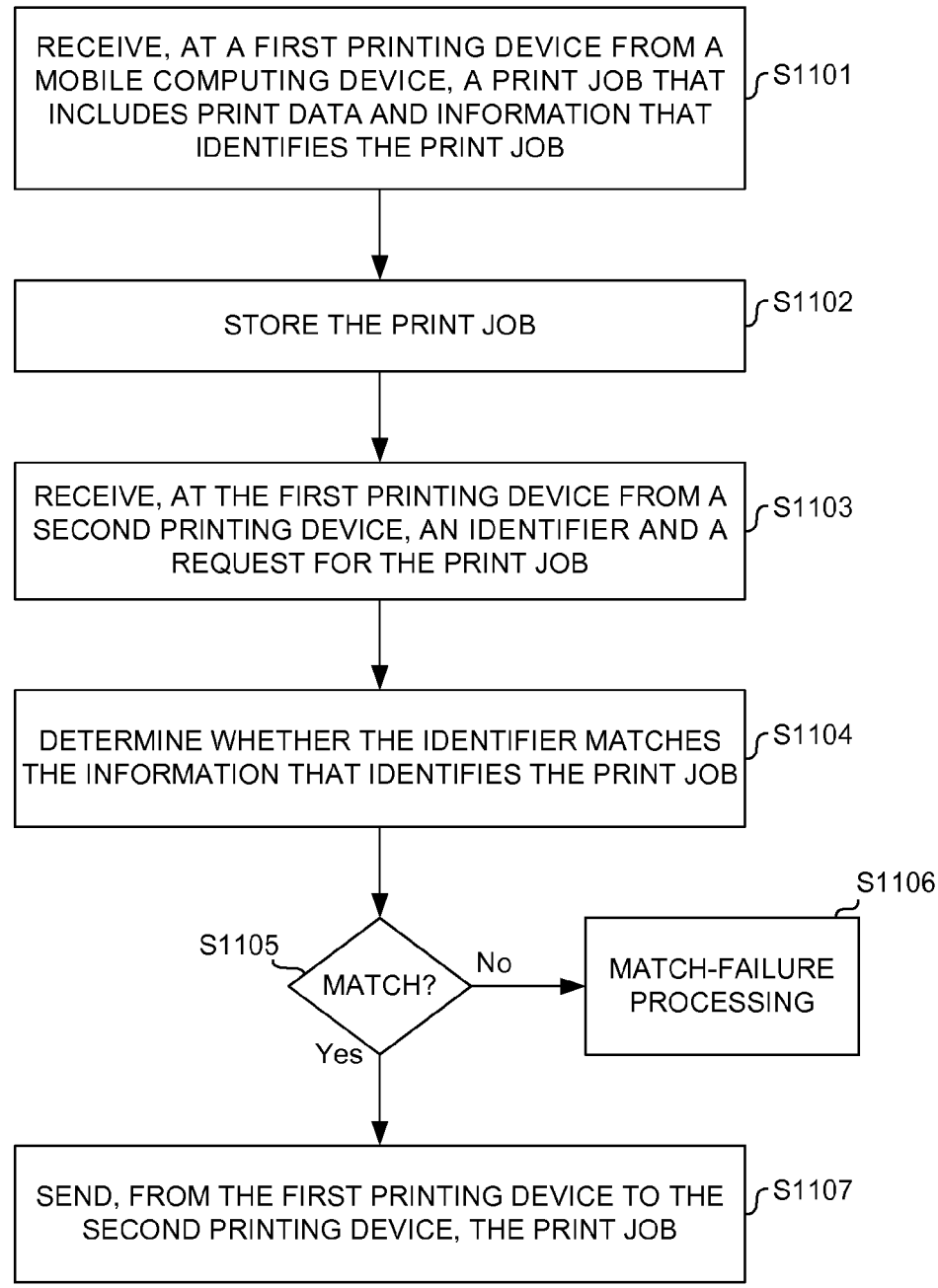
FIG. 11 illustrates an example flow of operations at a printing device.

FIG. 11 is described with reference to the example network environment 400 of FIG. 4. FIG. 11 illustrates an example flow of operations at a printing device (e.g., the printing device 100A, the printing device 100B, or the printing device 100C). One or more of the steps of FIG. 11 may be performed based on or in accordance with default settings for an application (e.g., the application 401A, the application 401B, or the application 401C) on the printing device, a predetermined policy, one or more inputs indicating one or more user selections, or a combination of two or more of these.

In step S1101, a first printing device receives a print job from the mobile computing device 200, the print job including print data and information that identifies the print job. In some embodiments, step S1101 includes receiving, at the first printing device from the mobile computing device 200, the print job the mobile computing device 200 sent in step S602. For example, in step S1101, the printing device 100C may receive from the mobile computing device 200 a print job that includes: (1) print data; and (2) a print job identifier that identifies the print job which was sent in step S602 and received in step S1101. In some embodiments, upon receipt of the print job in step S1101, the first printing device sends to the mobile computing device 200 a message indicating receipt of the print job. For example, the first printing device may send an acknowledgement to the mobile computing device 200.

In step S1102, the first printing device stores the print job received in step S1101. By way of example, in step S1102, the printing device 100C may store the print job in any suitable memory or storage location. The print job may be stored in a data store on the printing device 100C. The data store may be an area of memory or data storage that is managed by the application 401C and/or accessible to only the application 401C. Multiple print jobs may be stored in the data store. In step S1102, the print job may be stored in any suitable manner. For example, the print job may be stored as one or more files. Furthermore, information included in or associated with the print job may be stored as one or more entries in a data store. For example, the information that identifies the print job may be stored as an entry in a data structure such that the first printing device can search for and/or retrieve the information that identifies the print job and compare the information that identifies the print job to other data. In some embodiments, the first printing device stores the print job on the first printing device without executing a printing operation based on the print job.

In step S1103, the first printing device receives from a second printing device a request for the print job stored in step S1102. According to some embodiments, step S1103 includes receiving an identifier and a request for the print job having a matching identifier. The identifier may be a string of characters. In some embodiments, the request received in step S1103 is the request sent in step S1002 described with reference to FIG. 10. For example, in step S1103, the printing device 100C may receive from the printing device 100A that which the printing device 100A sent in step S1002, namely: the print job identifier, and the request for the print job having an identifier that matches the print job identifier. In some embodiments, the request received in step S1103 is a request for the printing device 100C to send to the printing device 100A the print job which the mobile computing device 200 sent to the printing device 100C in step S602 and which the printing device 100C received in step S1101.

In step S1104, the first printing device determines whether the identifier received in step S1103 matches the information that identifies the print job received in step S1101. In some embodiments, the first printing device may compare a string of characters received in step S1103 to the information that identifies the print job stored in a data store in step S1102. For example, the first printing device may search the data store and compare the string of characters received in step S1103 to one or more entries in the data store to determine whether the identifier received in step S1103 matches an entry in the data store.

In some embodiments, the printing device 100C receives a print job identifier from the mobile computing device 200 in step S1101 and stores the print job identifier in step S1102. Moreover, the printing device 100A receives the print job identifier from the mobile computing device 200 in step S1001 and sends the print job identifier to the printing device 100C in step S1002. Upon comparing the identifier received from the printing device 100A in step S1103 to the print job identifier stored as an entry in the data store in step S1102, the printing device 100C determines that the identifier received in step S1103 matches an entry in the data store, namely the print job identifier that identifies the print job received in step S1101. Accordingly, in some embodiments the first printing device determines in step S1104 that the identifier received in step S1103 matches the information that identifies the print job received in step S1101. On the other hand, the first printing device may determine in step S1104 that the identifier received in step S1103 does not match an entry in the data store on the first printing device. By way of example, information stored in a data store on the first printing device may have been cleared by a user operation, such as an administrator resetting the printing device, for example.

In step S1105, in response to determining that the identifier received in step S1103 does not match an entry in a data store on the first printing device (No in step S1105), the process advances to step S1106. In step S1106, the first printing device performs processing in response to the failure to find an identifier that matches the identifier received in step S1103. For example, the first printing device may send information to the second printing device indicating the failure to find a matching identifier or other information indicating that access to the requested print job is denied. On the other hand, in response to determining that the identifier received in step S1103 matches the information that identifies the print job received in step S1101 (Yes in step S1105), the process advances to step S1107.

In step S1107, the first printing device sends to the second printing device the print job requested in the request received in step S1103. In some embodiments, the print job sent in step S1107 is the print job received in step S1003 described with reference to FIG. 10. By way of example, in step S1107, the printing device 100C may send to the printing device 100A the print job that the printing device 100C received from the mobile computing device 200 in step S1101.

According to various implementations, the printing device 100A, the printing device 100B, and the printing device 100C may communicate with each other and exchange resources, such as print jobs, based on one or more instructions and/or requests from the mobile computing device 200. In some embodiments, the mobile computing device 200 sends a print job to a first printing device and maintains a record associated with the print job at the mobile computing device 200, as described with reference to FIG. 6. In response to a selection, the mobile computing device 200 uses the record to generate and send a message to a second printing device different from the first printing device, as described with reference to FIG. 8. The message comprises a request to execute the print job at the second printing device. Based on the message, the second printing device obtains the print job from the first printing device and executes the print job at the second printing device, as described with reference to FIG. 10.

By way of example, referring to FIG. 9A, the print job labeled "Document.pdf" may be a print job the mobile computing device 200 sent to the printing device 100A. In response to selection of the Release button 906 while the print job "Document.pdf" is designated as the selected print job and the printing device 100C "Printer C" is designated as the selected printing device, the mobile computing device 200 sends the message to the printing device 100C and, based on the message, the printing device 100C obtains the print job "Document.pdf" from the printing device 100A and executes a printing operation at the printing device 100C based on the print job "Document.pdf."

In some embodiments, the mobile computing device 200 sends a first print job to a first printing device and maintains a first record associated with the first print job at the mobile computing device 200; and the mobile computing device 200 sends a second print job to a second printing device different from the first printing device and maintains a second record associated with the second print job at the mobile computing device 200. In response to a selection, the mobile computing device 200 uses the first record and the second record to generate and send a message to a third printing device different from the first printing device and the second printing device. The message comprises a request to execute the first print job and the second print job at the third printing device. Based on the message, the third printing device obtains the first print job from the first printing device and the second print job from the second printing device and executes the first print job and the second print job at the third printing device.

By way of example, referring to FIG. 9C, the print job labeled "Example.pdf" may be a first print job the mobile computing device 200 sent to the printing device 100C, and the print job labeled "Image.tif" may be a second print job the mobile computing device 200 sent to the printing device 100B. In response to selection of the Release button of FIG. 9C while the print jobs "Example.pdf" and "Image.tif" are designated as selected print jobs and the printing device 100A "Printer A" is designated as the selected printing device, the mobile computing device 200 sends the message to the printing device 100A and, based on the message, the printing device 100A obtains the print jobs "Example.pdf" and "Image.tif" from the printing device 100C and the printing device 100B, respectively, and executes a printing operation based on the print job "Example.pdf" and a printing operation based on the print job "Image.tif" at the printing device 100A.

In some embodiments, the mobile computing device 200 sends a first print job to a first printing device and maintains a first record associated with the first print job at the mobile computing device 200; and the mobile computing device 200 sends a second print job to a second printing device different from the first printing device and maintains a second record associated with the second print job at the mobile computing device 200. In response to a selection, the mobile computing device 200 uses the first record and the second record to generate and send a message to the second printing device. The message comprises a request to execute the first print job and the second print job at the second printing device. Based on the message, the second printing device obtains the first print job from the first printing device and executes the first print job and the second print job at the second printing device.

By way of example, referring to FIG. 9C, the print job labeled "Example.pdf" may be a first print job the mobile computing device 200 sent to the printing device 100C, and the print job labeled "Image.tif" may be a second print job the mobile computing device 200 sent to the printing device 100A. In response to selection of the Release button of FIG. 9C while the print jobs "Example.pdf" and "Image.tif" are designated as selected print jobs and the printing device 100A "Printer A" is designated as the selected printing device, the mobile computing device 200 sends the message to the printing device 100A and, based on the message, the printing device 100A obtains the print job "Example.pdf" from the printing device 100C and executes a printing operation based on the print job "Example.pdf" and a printing operation based on the print job "Image.tif" at the printing device 100A. The print job "Image.tif" is executed at the printing device 100A based on information that identifies the print job labeled "Image.tif" (e.g., a print job identifier) being included in the message.

In some embodiments, a request that the print job be deleted is included in the message. For example, in some embodiments, the mobile computing device 200 sends a print job to a first printing device and maintains a record associated with the print job at the mobile computing device 200. In response to one or more inputs, the mobile computing device 200 uses the record to generate and send a message to a second printing device different from the first printing device, the message comprising a request to execute the print job at the second printing device and the message including a request that the print job be deleted from the first printing device. Based on the message, the second printing device sends, to the first printing device, a request for the print job and a request to delete the print job from the first printing device. The first printing device sends the print job to the second printing device and the second printing device executes the print job at the second printing device. Moreover, in response to the request to delete the print job from the first printing device, the first printing device deletes the print job from the first printing device.

In some embodiments, an authentication mechanism may be implemented in one or more operation work flows. For example, a printing device may require user authentication prior to registration of the printing device on the mobile computing device 200 in accordance with a registration process of FIG. 5. Further by way of example, a printing device may require user authentication prior to receiving a print job from the mobile computing device 200 in accordance with step S1101 of FIG. 11. Further by way of example, a printing device may require user authentication prior to receiving a message from the mobile computing device 200 in accordance with step S1001 of FIG. 10. Further by way of example, a printing device may require user authentication prior to sending a request to another printing device in accordance with step S1002 of FIG. 10. Further by way of example, a printing device may require authentication prior to sending a print job to another printing device in accordance with step S1107 of FIG. 11. Any suitable authentication mechanism may be implemented by a printing device, including an authentication mechanism that utilizes a remote authentication service for authenticating another computing device or a user. Any suitable credential may be used in the authentication process. In some embodiments, a credential or other information for use in the authentication process may be included in one or more of the following: the print job sent in step S602 and received in step S1101; the message sent in step S805 and received in step S1001; and the request sent in step S1002 and received in step S1103.

In some embodiments, various operations are executed at a printing device without requiring an input from a user. For example, receiving the message in step S1001, sending the request in step S1002, receiving the print job in step S1003, and executing the printing operation in step S1005 may be performed at a printing device over a period of time without requiring a user input for the duration of the period. In some embodiments, various operations are executed at a printing device without requiring a user to authenticate to the printing device or to another printing device. For example, receiving the message in step S1001, sending the request in step S1002, receiving the print job in step S1003, and executing the printing operation in step S1005 may be performed at a printing device without requiring a user to authenticate to the printing device or to another printing device.

The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the examples given above may also exist without departing from the scope of the invention. While particular examples of GUIs are illustrated, it will be understood that various other implementations of GUIs are within the scope of the present invention. For example, various features of the illustrated examples could be modified, rearranged, or removed, or one or more features could be added without departing from the scope of the invention.

The scope of the present invention includes a computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A system comprising:
    one or more processors; and
    one or more computer-readable media coupled to the one or more processors, the one or more computer-readable media storing instructions that, when executed by the one or more processors, cause a mobile computing device to perform operations comprising:
        sending, from the mobile computing device to a first printing device, a print job that includes information that identifies the print job, the first printing device comprising a first output device for printing on a sheet, the information that identifies the print job comprising a randomly generated string of characters;
        maintaining, at the mobile computing device, a record associated with the print job, the record including information for locating the first printing device and the information that identifies the print job; and
        sending, from the mobile computing device to a second printing device, a message that includes the information for locating the first printing device and the information that identifies the print job, the second printing device comprising a second output device for printing on a sheet, the message comprising a request to perform printing at the second printing device based on the print job, the information for locating the first printing device and the information that identifies the print job usable by the second printing device to obtain the print job from the first printing device by sending, from the second printing device to the first printing device, the information that identifies the print job and a request for the print job, wherein sending the request for the print job comprises using the information for locating the first printing device to send the request for the print job to the first printing device.

2. The system of claim 1, the operations further comprising:
determining, at the mobile computing device, that the print job was received by the first printing device; and
generating, at the mobile computing device, the record.

3. The system of claim 1, the operations further comprising:
generating, at the mobile computing device, the information that identifies the print job.

4. The system of claim 1, the operations further comprising:
presenting an interface element associated with the record in a graphical user interface on a display of the mobile computing device, the interface element enabling a user to request execution of the print job based on selection of the interface element; and
receiving one or more inputs indicating selection of the interface element,
wherein the sending the message is performed based on the selection of the interface element.

5. The system of claim 1, wherein the message further includes a request that the print job be deleted from the first printing device.

6. The system of claim 1, the operations further comprising:
obtaining, at the mobile computing device, information associated with the second printing device, the information associated with the second printing device usable by the mobile computing device to establish a communication session between the mobile computing device and the second printing device,
wherein the sending the message comprises using the information associated with the second printing device to send the message.

7. The system of claim 1, wherein the print job is executed at the second printing device based on the message.

8. The system of claim 1, the operations further comprising:
maintaining, at the mobile computing device, a second record associated with a second print job submitted to a third printing device, the second record including information for locating the third printing device and information that identifies the second print job,
wherein the message further includes the information for locating the third printing device and the information that identifies the second print job, the message comprising a request to execute the print job and the second print job at the second printing device.

9. The system of claim 1, the operations further comprising:
maintaining, at the mobile computing device, a second record associated with a second print job submitted to the second printing device, the second record including information for locating the second printing device and information that identifies the second print job,
wherein the message further includes the information that identifies the second print job, the message comprising a request to execute the print job and the second print job at the second printing device.

10. A method comprising:
sending, from a mobile computing device to a first printing device, a print job that includes information that identifies the print job, the first printing device comprising a first output device for printing on a sheet, the information that identifies the print job comprising a randomly generated string of characters;
maintaining, at the mobile computing device, a record associated with the print job, the record including information for locating the first printing device and the information that identifies the print job; and
sending, from the mobile computing device to a second printing device, a message that includes the information for locating the first printing device and the information that identifies the print job, the second printing device comprising a second output device for printing on a sheet, the message comprising a request to perform printing at the second printing device based on the print job, the information for locating the first printing device and the information that identifies the print job usable by the second printing device to obtain the print job from the first printing device by sending, from the second printing device to the first printing device, the information that identifies the print job and a request for the print job, wherein sending the request for the print job comprises using the information for locating the first printing device to send the request for the print job to the first printing device.

11. A non-transitory computer-readable medium storing instructions that, when executed by one or more processors, cause a mobile computing device to perform operations comprising:
sending, from the mobile computing device to a first printing device, a print job that includes information that identifies the print job, the first printing device comprising a first output device for printing on a sheet, the information that identifies the print job comprising a randomly generated string of characters;
maintaining, at the mobile computing device, a record associated with the print job, the record including information for locating the first printing device and the information that identifies the print job; and
sending, from the mobile computing device to a second printing device, a message that includes the information for locating the first printing device and the information that identifies the print job, the second printing device comprising a second output device for printing on a sheet, the message comprising a request to perform printing at the second printing device based on the print job, the information for locating the first printing device and the information that identifies the print job usable by the second printing device to obtain the print job from the first printing device by sending, from the second printing device to the first printing device, the information that identifies the print job and a request for the print job, wherein sending the request for the print job comprises using the information for locating the first printing device to send the request for the print job to the first printing device.

12. A system comprising:
one or more processors; and one or more computer-readable media coupled to the one or more processors, the one or more computer-readable media storing instructions that, when executed by the one or more processors, cause a first printing device to perform operations comprising:

receiving, at the first printing device from a mobile computing device, a message that includes information for locating a second printing device and information that identifies a print job submitted to the second printing device, the first printing device comprising a first output device for printing on a sheet, the second printing device comprising a second output device for printing on a sheet, the message comprising a request to execute the print job at the first printing device, the information that identifies the print job comprising a randomly generated string of characters;

sending, from the first printing device to the second printing device, the information that identifies the print job and a request for the print job, wherein sending the request for the print job comprises using the information for locating the second printing device to send the request for the print job to the second printing device;

receiving, at the first printing device from the second printing device, the print job based on the information that identifies the print job; and performing, at the first printing device, printing based on the print job.

13. The system of claim 12, wherein the receiving the message, the sending the request, the receiving the print job, and the performing the printing are performed over a period of time without requiring a user input for the duration of the period.

14. The system of claim 12, wherein the receiving the message, the sending the request, the receiving the print job, and the performing the printing are performed without requiring a user to authenticate to the first printing device or the second printing device.

15. The system of claim 12, wherein the message further includes a request that the print job be deleted from the second printing device, and wherein sending the information that identifies the print job and the request for the print job comprises sending, from the first printing device to the second printing device, the information that identifies the print job, the request for the print job and a request to delete the print job from the second printing device.

16. The system of claim 12, wherein the message further includes information for locating a third printing device and information that identifies a second print job, the message comprising a request to execute the print job and the second print job at the first printing device, the operations further comprising:

sending, from the first printing device to the third printing device, a request for the second print job;

receiving, at the first printing device from the third printing device, the second print job; and executing, at the first printing device, a printing operation based on the second print job.

17. The system of claim 12, wherein the message further includes information that identifies a second print job, the message comprising a request to execute the print job and the second print job at the first printing device, the operations further comprising:

determining, at the first printing device, that the second print job is stored at the first printing device based on the information that identifies the second print job; and executing, at the first printing device, a printing operation based on the second print job.

18. The system of claim 12, the operations further comprising:

receiving, at the first printing device from the mobile computing device, a second print job;

receiving, at the first printing device from a printing device different from the first printing device, a request for the second print job; and sending, from the first printing device to the printing device different from the first printing device, the second print job.

19. A method comprising:

receiving, at a first printing device from a mobile computing device, a message that includes information for locating a second printing device and information that identifies a print job submitted to the second printing device, the first printing device comprising a first output device for printing on a sheet, the second printing device comprising a second output device for printing on a sheet, the message comprising a request to execute the print job at the first printing device, the information that identifies the print job comprising a randomly generated string of characters;

sending, from the first printing device to the second printing device, the information that identifies the print job and a request for the print job, wherein sending the request for the print job comprises using the information for locating the second printing device to send the request for the print job to the second printing device;

receiving, at the first printing device from the second printing device, the print job based on the information that identifies the print job; and performing, at the first printing device, printing based on the print job.

20. A non-transitory computer-readable medium storing instructions that, when executed by one or more processors, cause a first printing device to perform operations comprising:

receiving, at the first printing device from a mobile computing device, a message that includes information for locating a second printing device and information that identifies a print job submitted to the second printing device, the first printing device comprising a first output device for printing on a sheet, the second printing device comprising a second output device for printing on a sheet, the message comprising a request to execute the print job at the first printing device, the information that identifies the print job comprising a randomly generated string of characters;

sending, from the first printing device to the second printing device, the information that identifies the print job and a request for the print job, wherein sending the request for the print job comprises using the information for locating the second printing device to send the request for the print job to the second printing device;

receiving, at the first printing device from the second printing device, the print job based on the information that identifies the print job; and performing, at the first printing device, printing based on the print job.

* * * * *